(12) United States Patent
Sato et al.

(10) Patent No.: US 11,449,621 B2
(45) Date of Patent: Sep. 20, 2022

(54) IMAGE FORMING APPARATUS CAPABLE OF USING BLOCKCHAIN, CONTROL METHOD, AND STORAGE MEDIUM

(71) Applicant: CANON KABUSHIKI KAISHA, Tokyo (JP)

(72) Inventors: Kei Sato, Kawasaki (JP); Mikihiko Kamekawa, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/930,170

(22) Filed: Jul. 15, 2020

(65) Prior Publication Data

US 2021/0019432 A1 Jan. 21, 2021

(30) Foreign Application Priority Data

Jul. 19, 2019 (JP) .............................. JP2019-133578

(51) Int. Cl.
| | |
|---|---|
| G06F 21/60 | (2013.01) |
| G06F 21/62 | (2013.01) |
| H04L 9/06 | (2006.01) |
| H04N 1/44 | (2006.01) |
| H04L 9/00 | (2022.01) |

(52) U.S. Cl.
CPC ........ *G06F 21/608* (2013.01); *G06F 21/6209* (2013.01); *H04L 9/0643* (2013.01); *H04N 1/444* (2013.01); *H04N 1/4413* (2013.01); *H04L 9/50* (2022.05)

(58) Field of Classification Search
None
See application file for complete search history.

(56) References Cited

U.S. PATENT DOCUMENTS

2019/0171849 A1* 6/2019 Assenmacher ......... G06F 21/64
2020/0341702 A1* 10/2020 Kosaka ................. G06F 3/1222

FOREIGN PATENT DOCUMENTS

JP 2018-128823 A 8/2018

* cited by examiner

*Primary Examiner* — Lennin R Rodriguezgonzalez
(74) *Attorney, Agent, or Firm* — Canon U.S.A., Inc. IP Division

(57) ABSTRACT

An image forming apparatus is provided and includes a transmitting unit and a blockchain cooperation unit. When an instruction for using a blockchain service is received from a user, after electronic data transmitted by the transmitting unit is stored in a management service, the blockchain cooperation unit transmits, to the blockchain service, information about the electronic data including information indicating that storing of the electronic data transmitted by the transmitting unit has been completed.

27 Claims, 18 Drawing Sheets

IMAGE FORMING APPARATUS CAPABLE OF USING BLOCKCHAIN, CONTROL METHOD, AND STORAGE MEDIUM

BACKGROUND

Field

Aspects of the present disclosure generally relate to an image forming apparatus, a control method, and a storage medium each of which is capable of coping with tampering of records of electronic data with use of a blockchain.

Description of the Related Art

There is a known technique to, for the purpose of preventing tampering of an electronic file, insure the reliability of changes in content of the electronic file by using a blockchain, as discussed in Japanese Patent Application Laid-Open No. 2018-128823.

SUMMARY

According to an aspect of the present disclosure, an image forming apparatus that cooperates with a management service which receives electronic data via a network and stores the electronic data and a blockchain service which manages information about the stored electronic data on a block-by-block basis and, upon defining association of each block with a previous and/or subsequent block, manages a plurality of blocks with a plurality of nodes includes a transmitting unit configured to, in response to receiving an instruction for storing the electronic data from a user, transmit, to the management service, the electronic data generated based on an original read by a scanner of the image forming apparatus, and a blockchain cooperation unit configured to transmit information about the electronic data to the blockchain service, wherein, when receiving an instruction for using the blockchain service from the user, after the electronic data transmitted by the transmitting unit is stored in the management service, the blockchain cooperation unit transmits, to the blockchain service, information about the electronic data including information indicating that storing of the electronic data transmitted by the transmitting unit has been completed.

Further features of the present disclosure will become apparent from the following description of exemplary embodiments with reference to the attached drawings.

DESCRIPTION OF THE EMBODIMENTS

When an image forming apparatus equipped with a scanner and a printer performs scanning or printing, an electronic file is relevant thereto. While the case of registering information about such an electronic file with a blockchain service is conceivable, how the image forming apparatus cooperates with the blockchain service has still not been considered.

Aspects of the present disclosure are generally directed to providing an image forming apparatus which cooperates with a blockchain service and causing the image forming apparatus to cooperate with the blockchain service in an appropriate manner.

Figure 1:
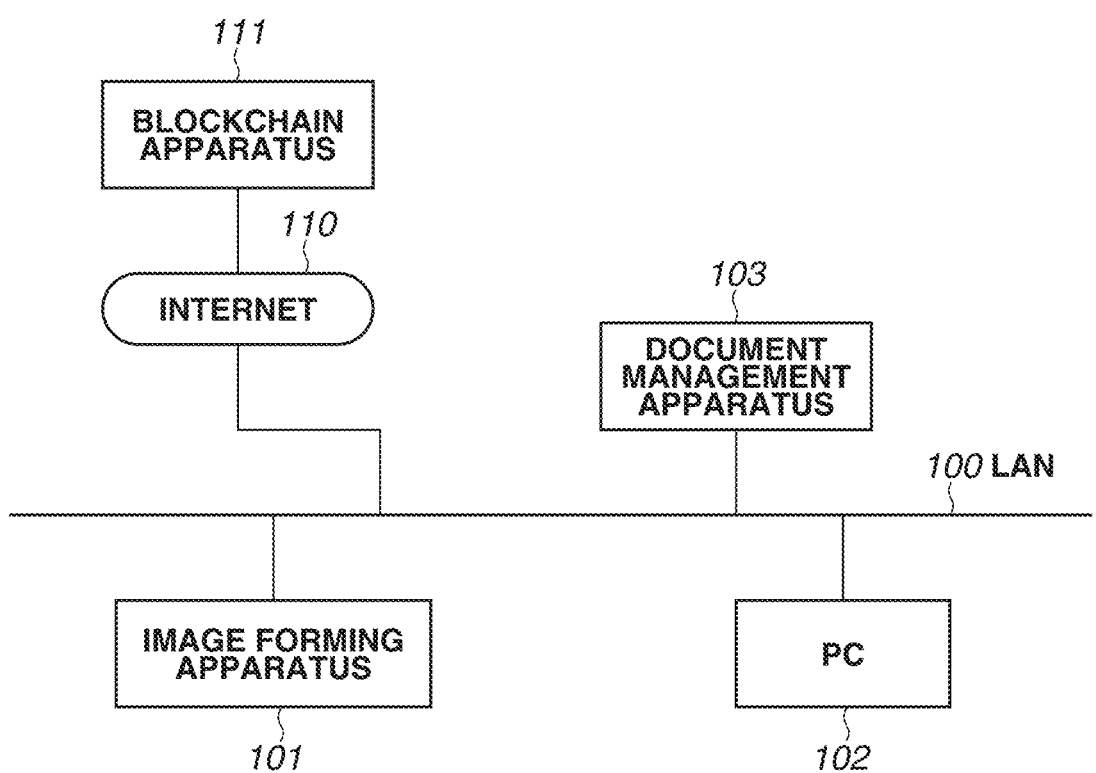
FIG. 1 is a diagram illustrating a configuration of a system.

Various exemplary embodiments, features, and aspects of the disclosure will be described in detail below with reference to the drawings. FIG. 1 is an overall view of a system associated with an image forming apparatus 101. The image forming apparatus 101, a personal computer (PC) 102, and a document management apparatus 103 are located in an intranet while being connected to a local area network (LAN) 100, and perform communication with a blockchain apparatus 111 via the Internet 110. The PC 102 is used to manage the image forming apparatus 101 with use of a web browser and to perform printing with the image forming apparatus 101 with use of a printer driver.

The blockchain apparatus 111 is an apparatus which collectively manages information about electronic documents generated by the image forming apparatus 101 or the PC 102 on a block-by-block basis and is thus an apparatus which provides a blockchain service for insuring the validity of each electronic document. The document management apparatus 103 is an apparatus which stores an electronic document generated by the image forming apparatus 101 or the PC 102 and is thus an apparatus which provides a document management service.

Figure 2:
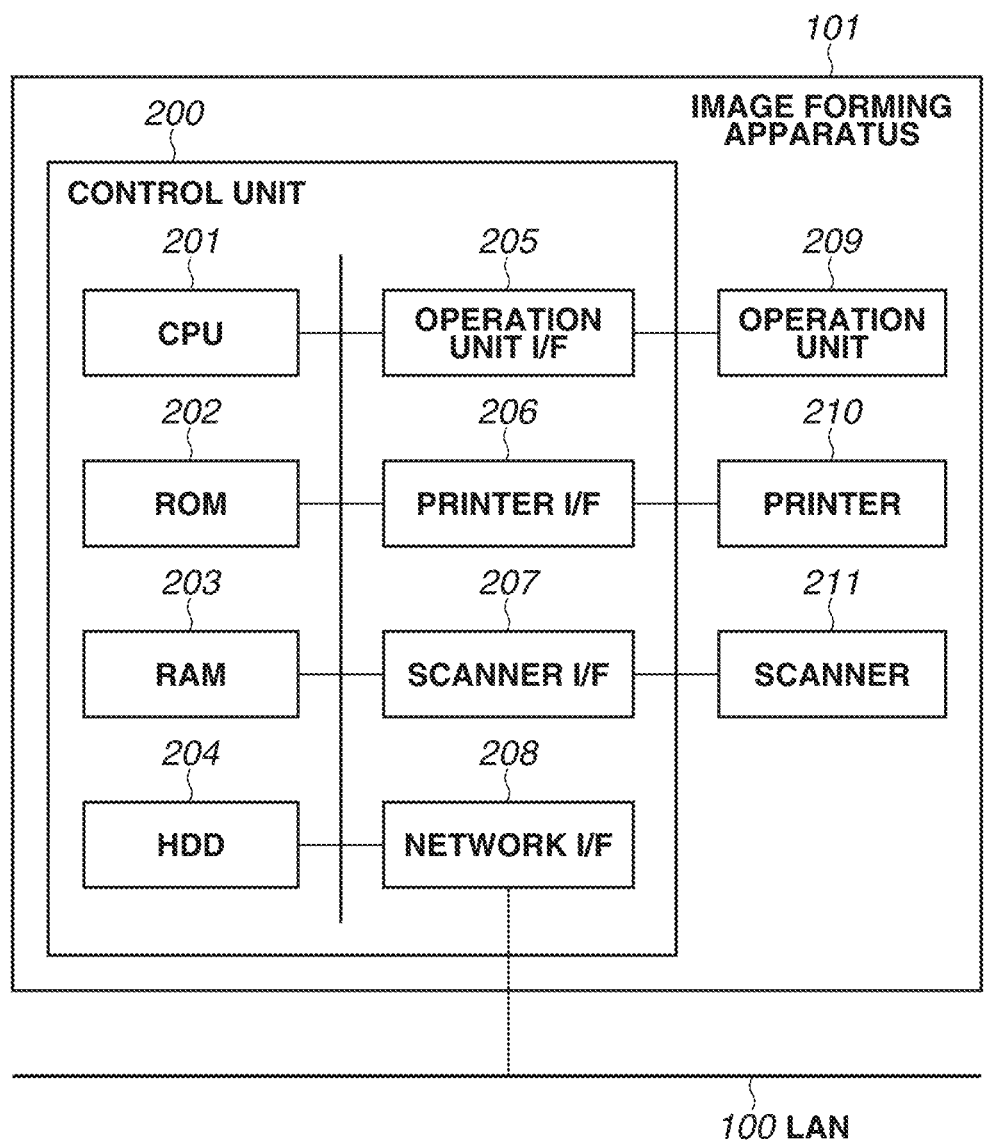
FIG. 2 is a diagram illustrating a hardware configuration of an image forming apparatus.

FIG. 2 is a block diagram illustrating a hardware configuration of the image forming apparatus 101. A control unit 200, which includes a central processing unit (CPU) 201, controls operations of the entire image forming apparatus 101. The CPU 201 reads out control programs stored in a read-only memory (ROM) 202 and performs various control operations, such as read control and transmission control, based on the control programs. A random access memory (RAM) 203 is used as a temporary storage region, such as a main memory and a work area, for the CPU 201. A hard disk drive (HDD) 204 stores image data and various programs or various pieces of data described below. The image forming apparatus 101 has a hardware configuration serving as an information processing apparatus and, in addition, further has the following hardware configuration.

An operation unit interface (I/F) 205 interconnects an operation unit 209 and the control unit 200. A printer I/F 206 interconnects a printer 210 and the control unit 200. Image data to be printed by the printer 210 is transferred from the control unit 200 via the printer IF 206 and is then printed on a recording medium by the printer 210. A scanner I/F 207 interconnects a scanner 211 and the control unit 200. The scanner 211 reads an image on an original to generate image data, and then inputs the generated image data to the control unit 200 via the scanner IF 207.

A network I/F 208 connects the control unit 200 (i.e., the image forming apparatus 101) to the LAN 100. The network I/F 208 transmits image data or information to an external apparatus on the LAN 100 and receives various pieces of information from an external apparatus on the LAN 100.

Figure 3:
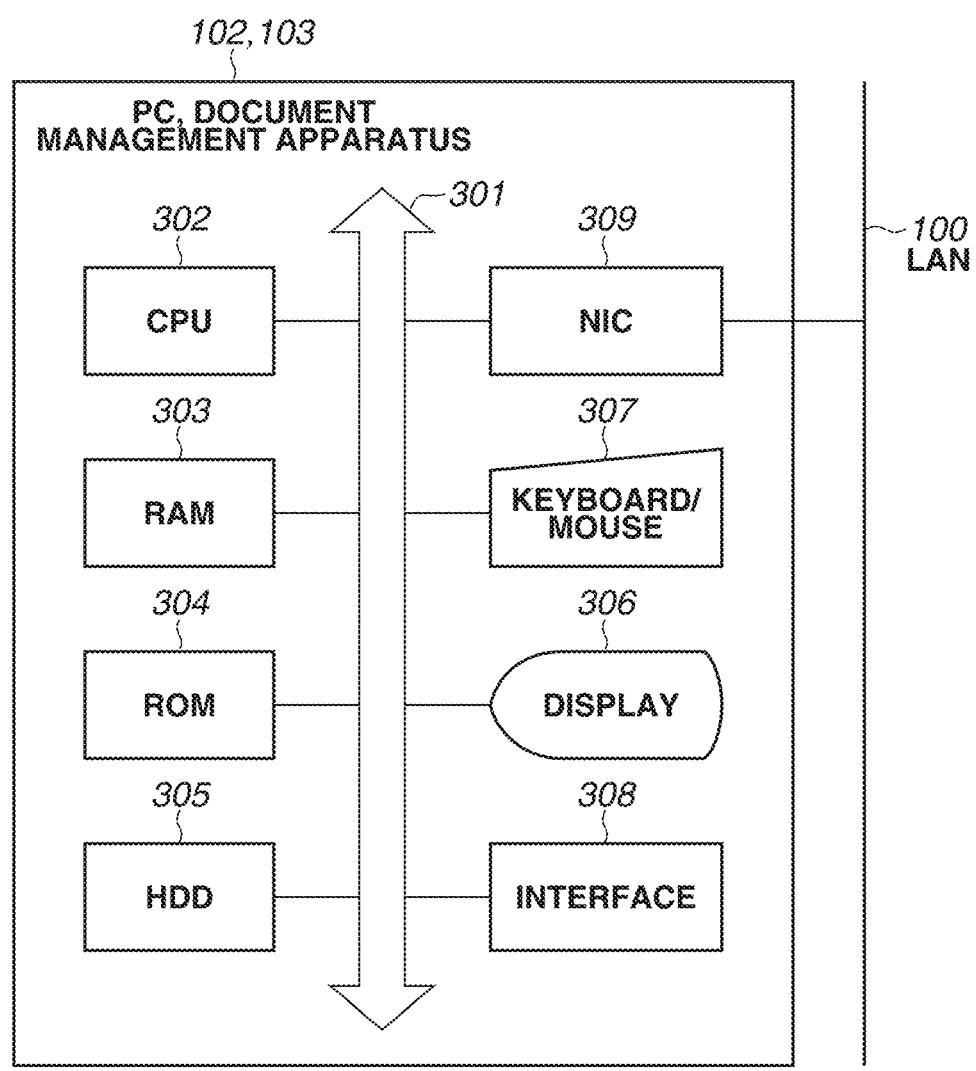
FIG. 3 is a diagram illustrating a hardware configuration of each of a personal computer (PC) and a document management apparatus.

FIG. 3 is a block diagram illustrating a hardware configuration of each of the PC 102 and the document management apparatus 103. A CPU 302 controls the entire PC 102 or document management apparatus 103. The CPU 302 executes, for example, an application program and an operating system (OS) stored in an HDD 305 and performs control to temporarily store, for example, information and files required for execution of the program in a RAM 303. A ROM 304, which is a storage unit, stores therein various pieces of data such as a basic input-output (IO) program. The RAM 303, which is a temporary storage unit, serves as, for example, a main memory and a work area for the CPU 302. The HDD 305, which is an external storage unit, serves as a large-capacity memory and stores, for example, application programs such as an office application and a web browser, an OS, and relevant programs.

A display 306, which is a display unit, displays, for example, a command input via a keyboard/mouse 307, which is an instruction input unit. An interface 308, which is an external apparatus interface (I/F), is used to connect to a printer, a Universal Serial Bus (USB) device, or a peripheral device. A system bus 301 is used for data to flow between the respective units of the PC 102 or the document management apparatus 103. A network interface card (NIC) 309 performs exchange of data with an external apparatus via the LAN 100.

Furthermore, the configuration of such an information processing apparatus is merely an example, and is not limited to the configuration examples illustrated in FIG. 2 and FIG. 3. For example, the storage location of data or programs can be changed between, for example, the ROM 304, the RAM 303, and the HDD 305 depending on characteristics thereof. Unless otherwise specifically described in the present exemplary embodiment, respective processing operations are assumed to be implemented by the CPU 302 loading programs stored in, for example, the ROM 304 onto, for example, the RAM 303 and executing the programs.

Figure 4:
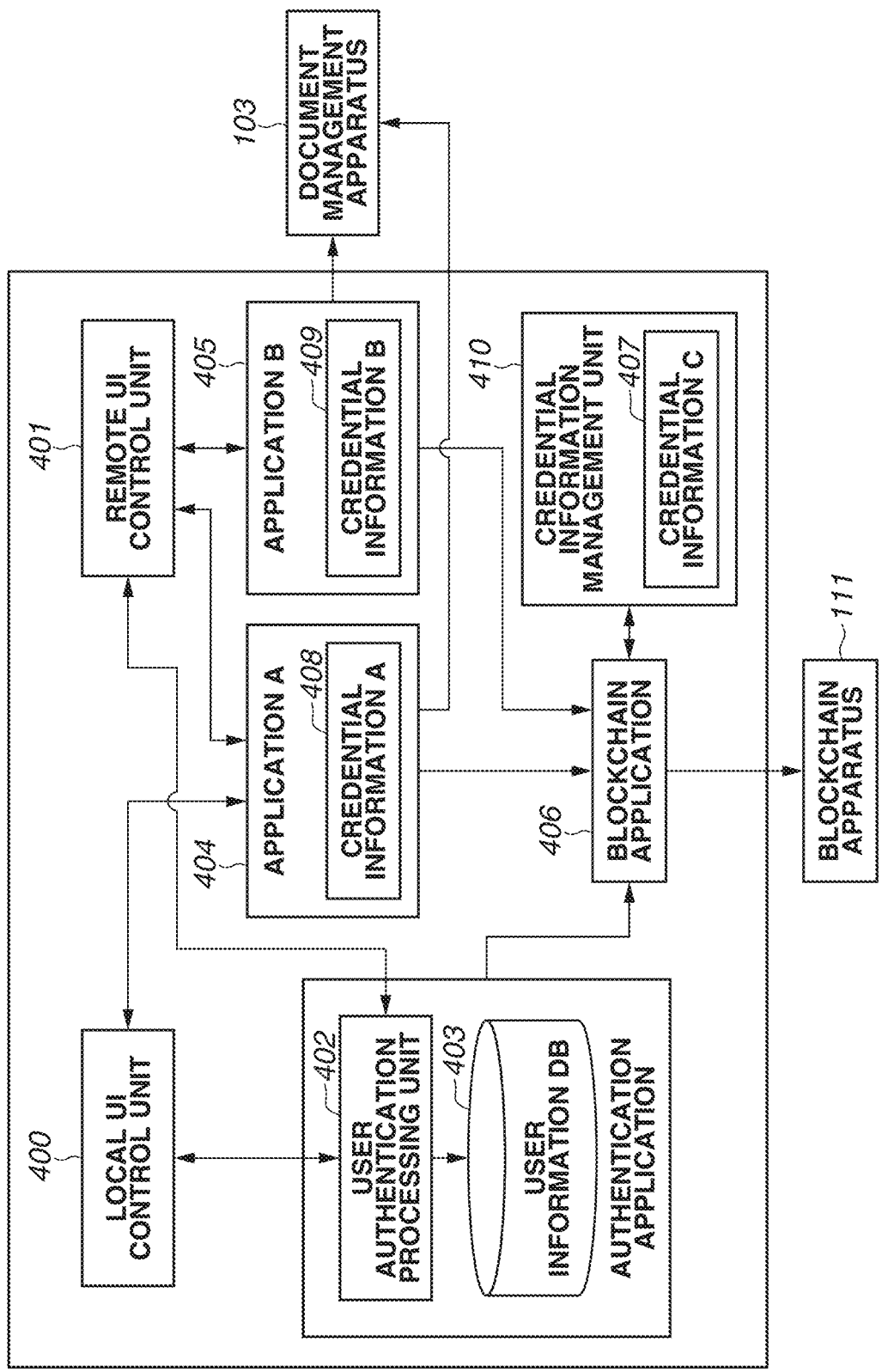
FIG. 4 is a diagram illustrating a software configuration of the image forming apparatus.
Figure 9A:
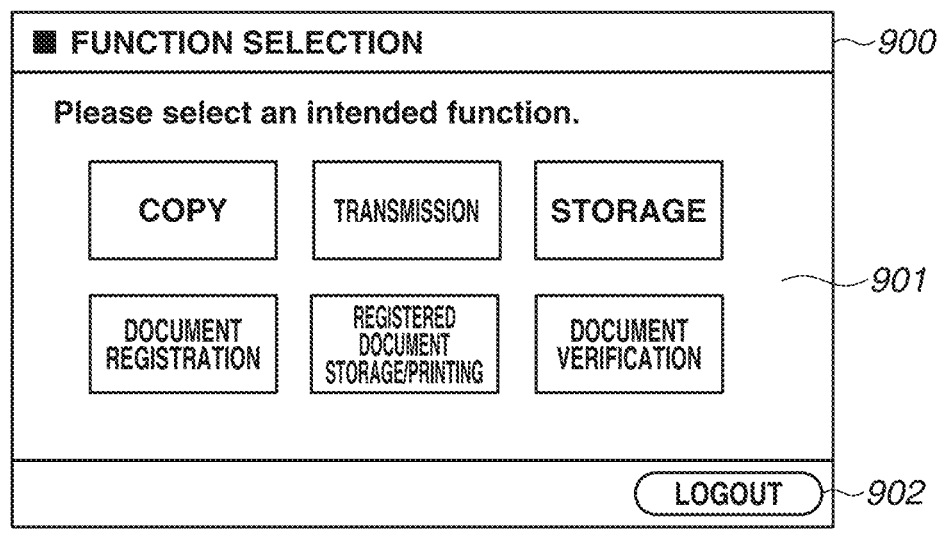
FIGS. 9A and 9B are diagrams illustrating examples of function selection screens.

FIG. 4 is a block diagram illustrating a software configuration related to the present exemplary embodiment in the image forming apparatus 101. Unless otherwise described, each processing unit is a control program stored in the ROM 202. A local user interface (UI) control unit 400 provides the function of controlling the operation unit 209 via the operation unit IF 205. The local UI control unit 400 communicates the content of an operation performed by the user via the operation unit 209 to a user authentication processing unit 402 or an application A 404. The local UI control unit 400 displays a function selection screen 900 on the operation unit 209. FIG. 9A illustrates an example of the function selection screen 900. The local UI control unit 400 performs control to display a screen on the operation unit 209 upon receiving a screen display request from the user authentication processing unit 402 or the application A 404. The user authentication processing unit 402 or the application A 404 displays a screen on the operation unit 209 via the local UI control unit 400.

Figure 9B:
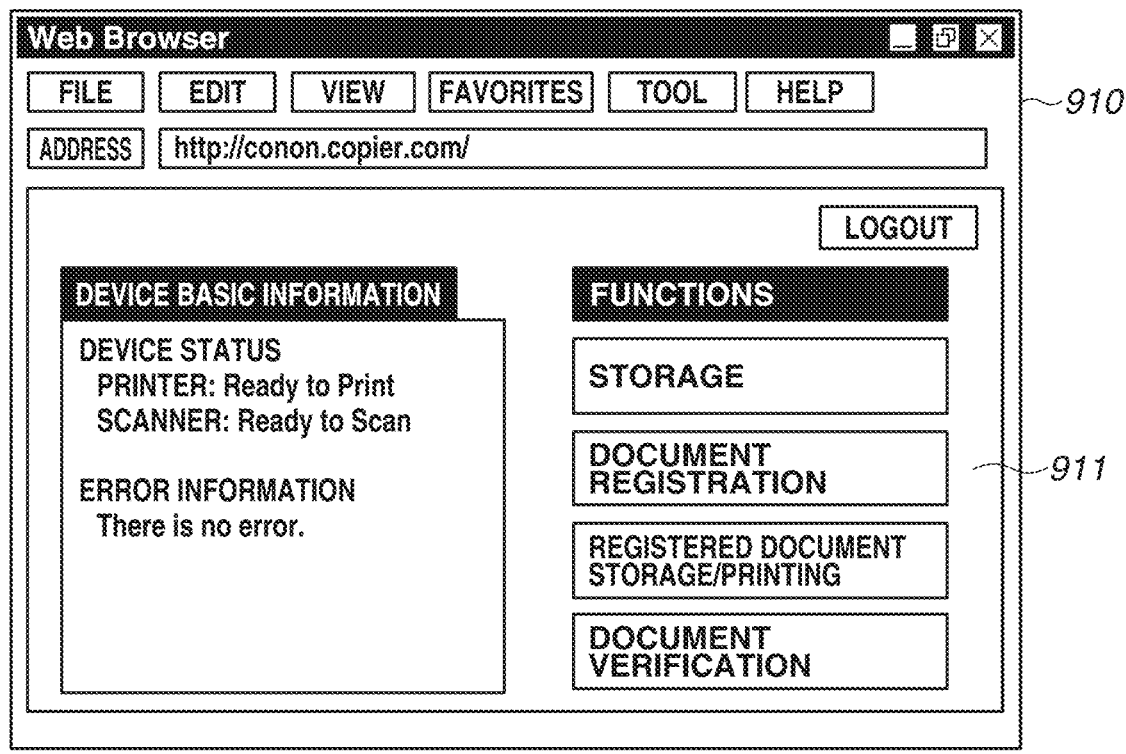

A remote UI control unit 401 provides a web page to a web browser on the PC 102 via the network I/F 208. The remote UI control unit 401 communicates the content of an operation performed by the user on the web browser to the user authentication processing unit 402, the application A 404, or an application B 405. The remote UI control unit 401 displays a function selection screen 910 on a web browser on the PC 102. FIG. 9B illustrates an example of the function selection screen 910. The remote UI control unit 401 performs control to display a web page on the web browser upon receiving a request from the user authentication processing unit 402, the application A 404, or the application B 405. The user authentication processing unit 402, the application A 404, or the application B 405 causes the web browser to display a web page via the remote UI control unit 401.

Figure 7A:
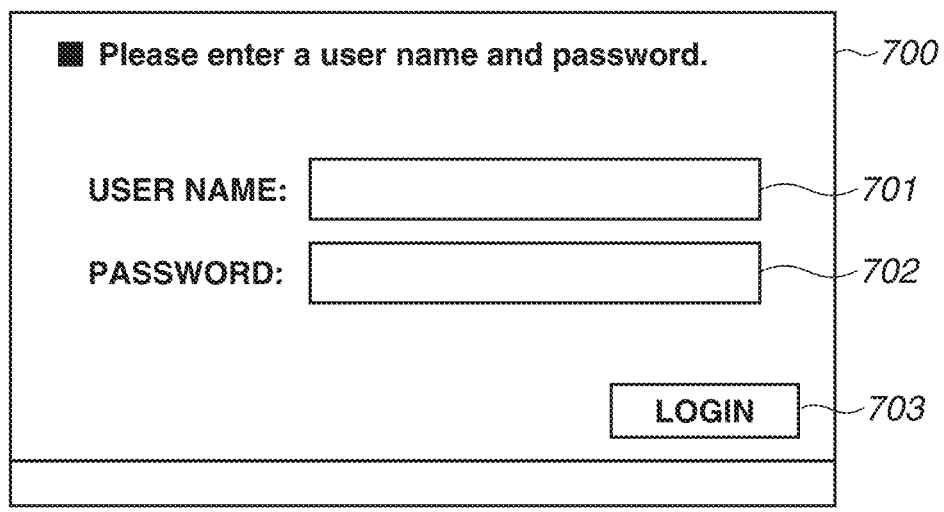
FIGS. 7A and 7B are diagrams illustrating examples of authentication screens.

The user authentication processing unit 402 provides the function of authenticating a user who uses the image forming apparatus 101. Therefore, the user authentication processing unit 402 displays an authentication screen 700, an example of which is illustrated in FIG. 7A, on the operation unit 209. The user authentication processing unit 402 performs user authentication by receiving, via the authentication screen 700, authentication information including a user name and a password input by the user and then comparing the received authentication information with user information stored in a user information database (DB) 403.

The user information DB 403 provides the function of storing user information which is information about users who use the image forming apparatus 101. The user information DB 403 is created in the HDD 204, and pieces of information constituting the user information DB 403 are stored in the HDD 204. Examples of pieces of information which are stored in the user information DB 403 are shown in Table 1 and Table 2.

TABLE 1

User Information Table

| User name | Password | Role |
|---|---|---|
| UserA | **** | Administrator |
| UserB | **** | General User |
| Guest | — | Guest User |

The user information table shown in Table 1 is configured with columns "user name", "password", and "role", and the authentication information and the role are associated with each other. The column "user name" indicates a name for uniquely identifying a user. The column "password" indicates a password which is used for user authentication, and is allowed to be set to an optional value for each user. The column "role" indicates a use authority for the image forming apparatus 101 conferred to each user of the image forming apparatus 101, and, in the present exemplary embodiment, includes three roles, i.e., "administrator", "general user", and "guest user".

The role "administrator" is a role allocated to an administrator user of the image forming apparatus 101, and the role "general user" is a role allocated to a general user who uses the image forming apparatus 101. The role "guest user" is a role allocated to a user with respect to whom functions allowed to be used are intended to be restricted, and is a role allocated in a case where the user uses functions without registering authentication information such as a user name and a password with the user information DB 403. Since functions allowed to be used are determined according to the value of the column "role" of the logged-in user, it is possible to impose restrictions on the use of functions of the image forming apparatus 101 for each role.

TABLE 2

Role Information Table

| Role | Copy | Transmission | Storage | BC registration |
|---|---|---|---|---|
| Administrator | Allowed | Allowed | Allowed | Allowed |
| General User | Allowed | Inhibited | Allowed | Allowed |
| Guest User | Allowed | Inhibited | Inhibited | Inhibited |

| Role | BC storage/printing | BC verification |
|---|---|---|
| Administrator | Allowed | Allowed |
| General User | Allowed | Allowed |
| Guest User | Inhibited | Allowed |

The role information table shown in Table 2 is configured with columns "role", "copy", "transmission", "storage", "BC registration", "BC storage/printing", and "BC verification". The columns "copy" "transmission", "storage", "BC registration", "BC storage/printing", and "BC verification" represent the respective functions included in the image forming apparatus 101, and the values of the respective columns represent whether the use of each function is allowed or inhibited with respect to each role. The columns "copy", "transmission", and "storage" represent authorities regarding a copy function, a scan function for transmitting a scanned document to the PC 102, and a function for storing a scanned electronic document in the HDD 204.

The column "BC registration" represents an authority for the function of registering information about a document with the blockchain apparatus 111. The column "BC storage/printing" represents an authority for the function of storing, in the image forming apparatus 101, or printing a document stored in the document management apparatus 103 associated with document information registered with the blockchain apparatus 111. The column "BC verification" represents an authority for the function of verifying whether the document is a valid document based on document information registered with the blockchain apparatus 111. Applications included in the image forming apparatus 101 perform restrictions on the respective functions according to the authority of a role in the role information table corresponding to the role of the logged-in user.

In the present exemplary embodiment, roles such as "administrator" are prepared in terms of a level of authority of the user. However, a dedicated role or roles for using a blockchain service, such as a "BC role" or, in more detail, such as a "BC registration role" and a "BC storage/printing role", can be prepared.

The application A 404 provides a function of converting a scanned document into an electronic document and supplying information about the document to the blockchain apparatus 111 via a blockchain application 406 and registering the document with the document management apparatus 103. The application A 404 provides a function of receiving a registered document and printing the document via the printer I/F 206. The application A 404 performs transmission of scanned data to an external apparatus by controlling the scanner 211 via the scanner I/F 207 and transmitting data to the LAN 100 via the network I/F 208. The application A 404 provides screen information to the local UI control unit 400 and the remote UI control unit 401.

Figure 10A:
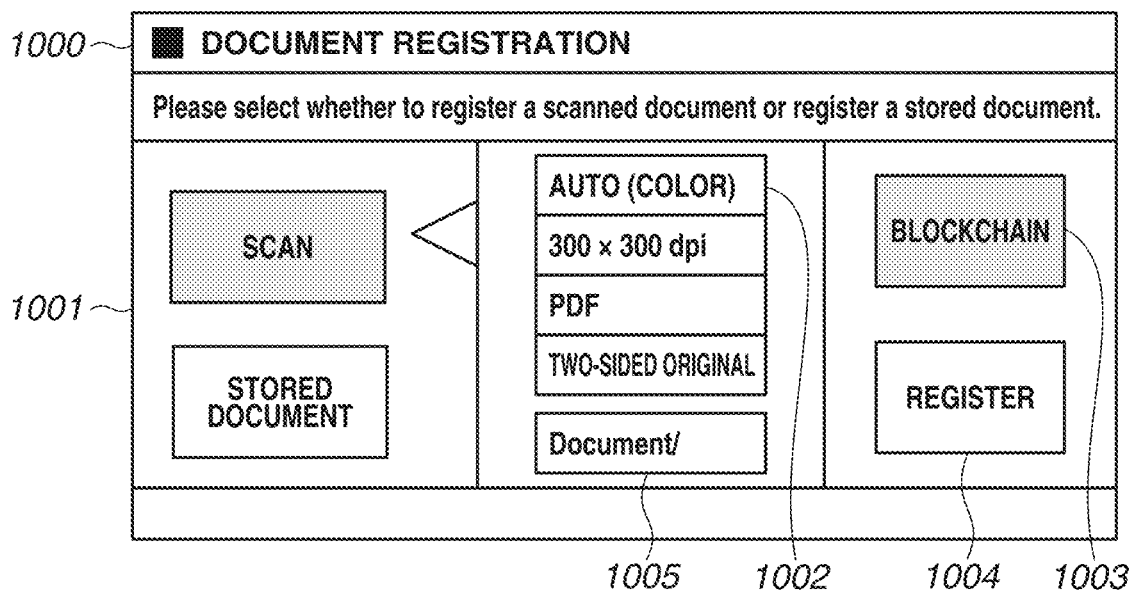
FIGS. 10A, 10B, 10C, and 10D are diagrams illustrating examples of document registration screens for an application A.
Figure 11A:
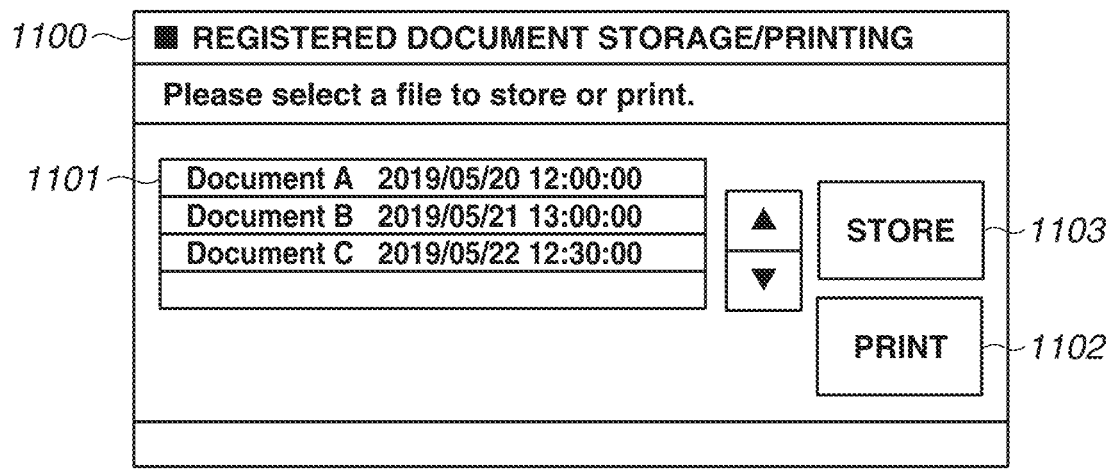
FIGS. 11A and 11B are diagrams illustrating examples of registered document storage/printing screens for the application A.
Figure 12A:
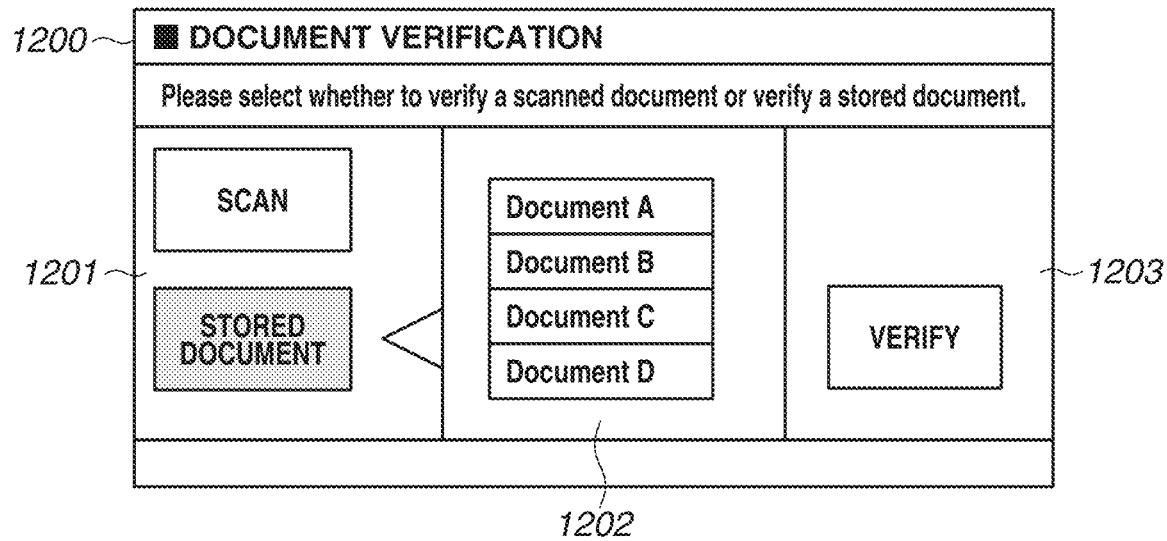
FIGS. 12A and 12B are diagrams illustrating examples of registered document verification screens for the application A.

The application A 404 receives an input to a screen displayed on the operation unit 209 via the local UI control unit 400, and performs processing according to the received input. The application A 404 displays a registration screen 1000, a registered document storage/printing screen 1100, and a verification screen 1200 on the operation unit 209. An example of the registration screen 1000 is illustrated in FIG. 10A, an example of the registered document storage/printing screen 1100 is illustrated in FIG. 11A, and an example of the verification screen 1200 is illustrated in FIG. 12A.

Figure 10C:
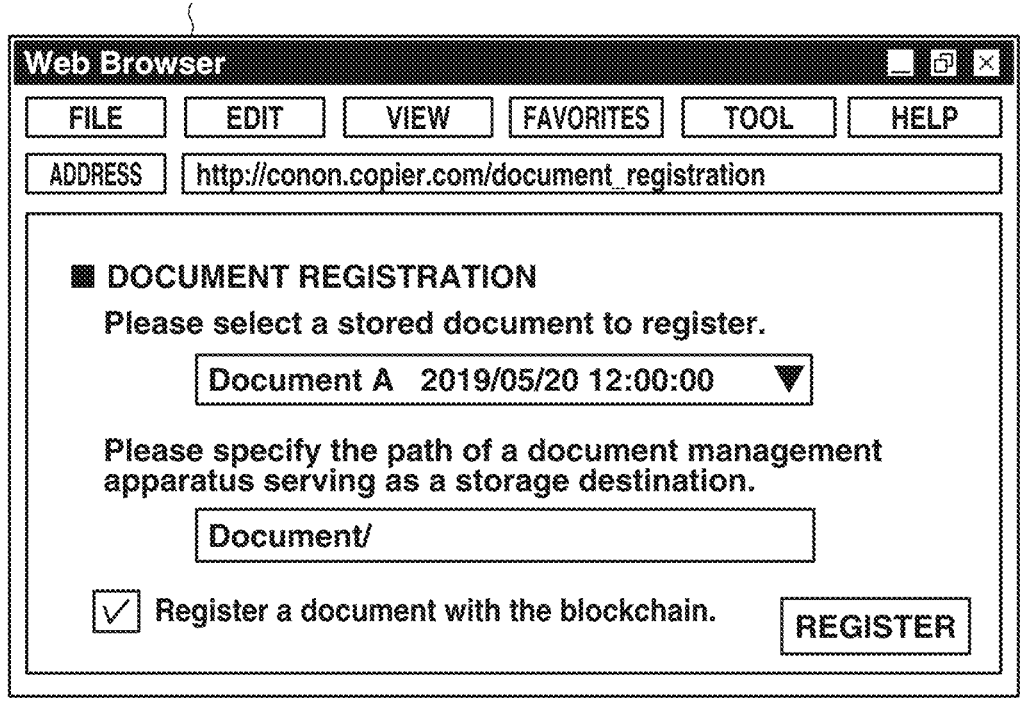
Figure 11B:
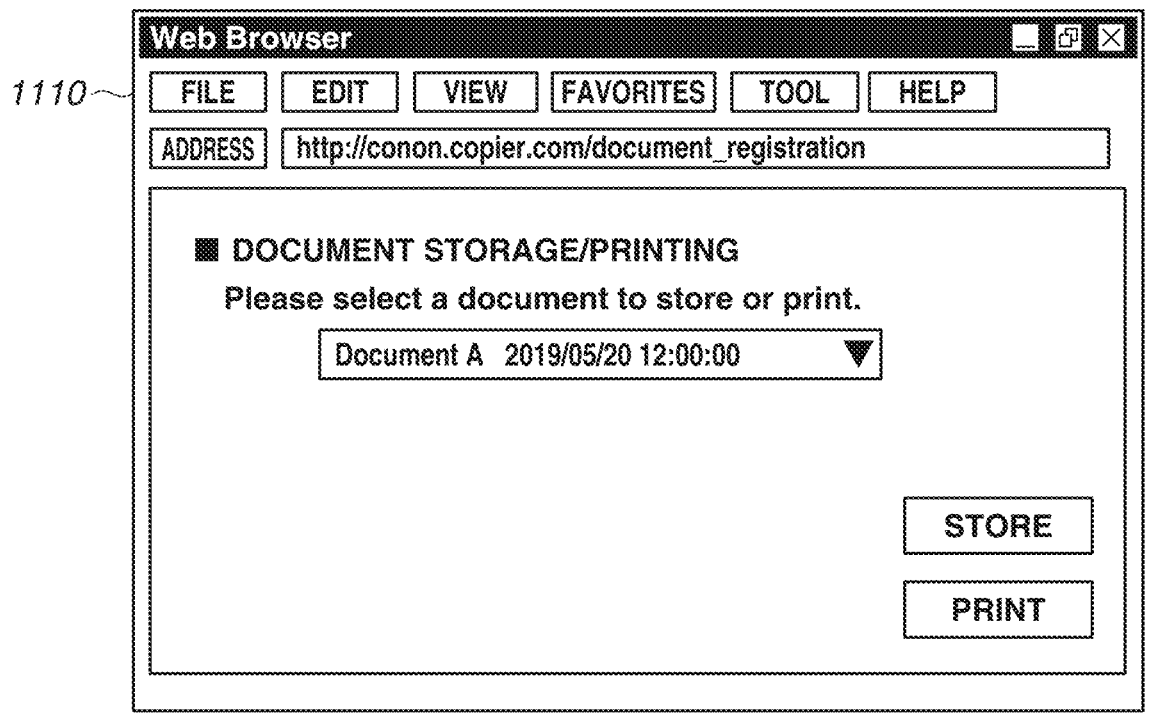
Figure 12B:
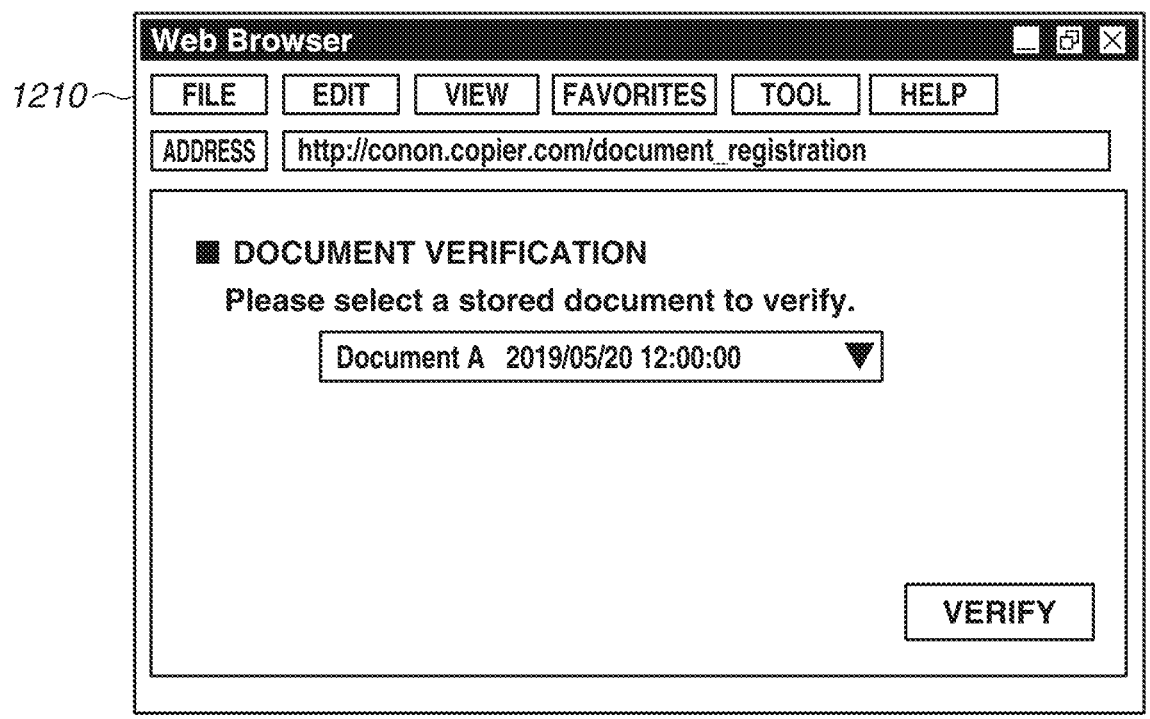

Moreover, the application A 404 receives an input from a web browser on the PC 102 via the remote UI control unit 401, and performs processing according to the received input. The application A 404 displays a registration screen 1020, a registered document storage/printing screen 1110, and a verification screen 1210 on the web browser on the PC 102. An example of the registration screen 1020 is illustrated in FIG. 10C, an example of the registered document storage/printing screen 1110 is illustrated in FIG. 11B, and an example of the verification screen 1210 is illustrated in FIG. 12B.

Furthermore, while an example in which the functions of registration, printing, and verification of a document are included in a single application is described, such functions can be shared by a plurality of applications. For example, a configuration in which a scan application for performing registration of a document and a printing application for performing printing are separately provided is conceivable.

The application B 405 provides a function of converting a scanned document into an electronic document and supplying information about the document to the blockchain apparatus 111 via the blockchain application 406 and registering the document with the document management apparatus 103, as with the application A 404. The application B 405 provides screen information to the remote UI control unit 401. While the application A 404 treats inputs and outputs from both a local UI and a remote UI via the local UI control unit 400 and the remote UI control unit 401, the application B 405 differently treats inputs and outputs from only a remote UI via the remote UI control unit 401. Furthermore, the application A 404 and the application B 405 do not directly communicate with the blockchain apparatus 111.

Figure 6:
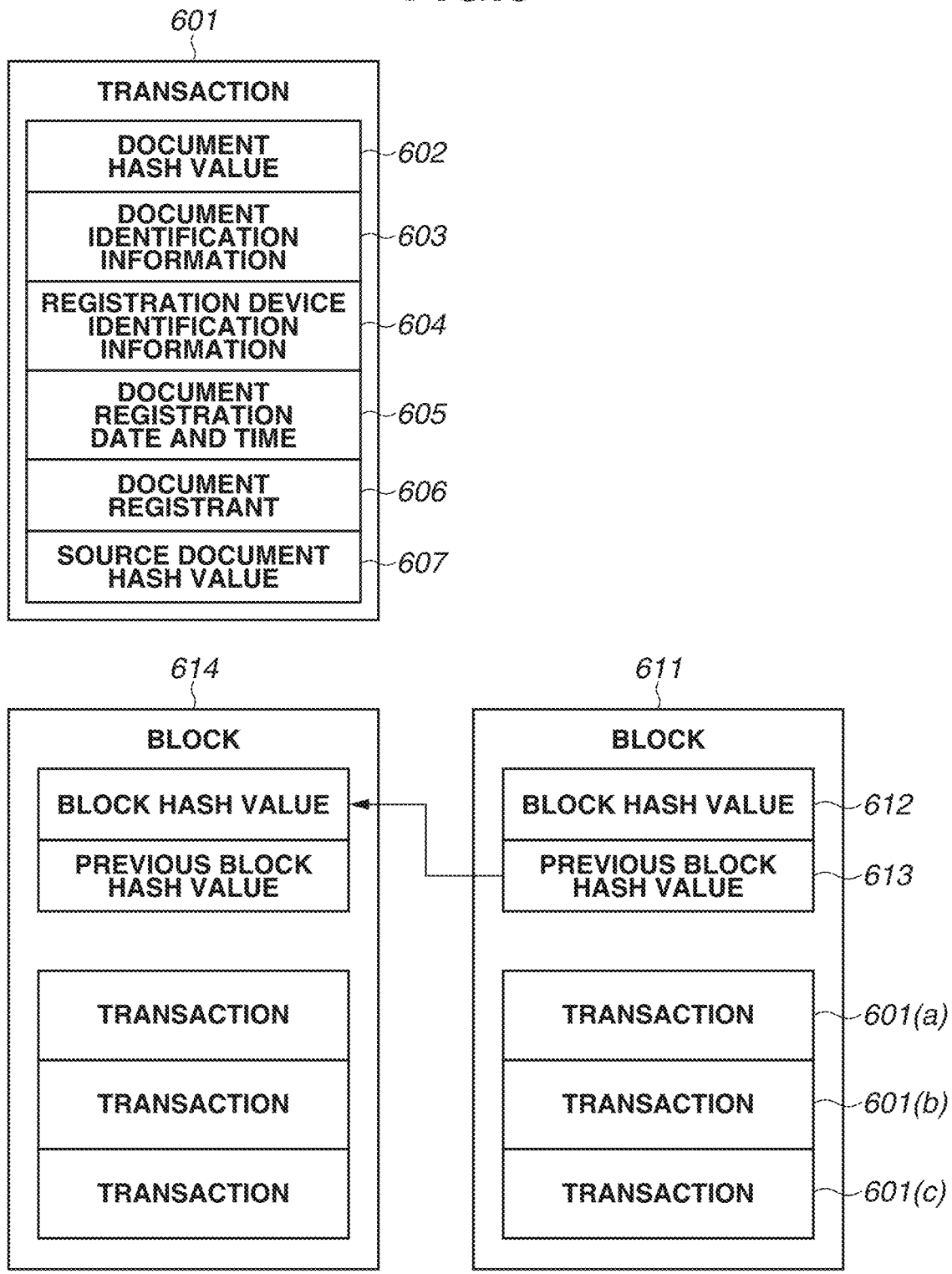
FIG. 6 is a diagram illustrating a data configuration for a blockchain apparatus.

The blockchain application 406 is an application for performing blockchain cooperation, and provides the function of receiving an instruction from the application A 404 or the application B 405 and registering, acquiring, and verifying information about a document with respect to the blockchain apparatus 111. Examples of a transaction 601 and blocks which the blockchain application 406 registers with the blockchain apparatus 111 are illustrated in FIG. 6, but details thereof are described below.

When receiving an instruction for the blockchain apparatus 111 from an application, the blockchain application 406 also receives credential information from a credential information management unit 410. The blockchain application 406 performs verification of the received credential information, and performs processing with respect to the blockchain apparatus 111 only when the verification is successful.

Credential information A 408 is credential information for insuring that the application A 404 is a legitimate application which is allowed to use the blockchain apparatus 111. The credential information A 408 is issued with respect to an application which has been verified to be performing correct processing, and the application with the credential information incorporated therein is loaded on the image forming apparatus 101.

Credential information B 409 is credential information for insuring that the application B 405 is a legitimate application which is allowed to use the blockchain apparatus 111. The credential information B 409 is loaded on the image forming apparatus 101 as with the credential information A 408.

Credential information C 407 is credential information for insuring that the image forming apparatus 101 is a legitimate apparatus which is allowed to use the blockchain apparatus 111. The credential information C 407 can be issued for each apparatus manufacturer by, for example, an organization which administrates the present system. The credential information C 407 can be shipped out in the state of being incorporated in firmware of the image forming apparatus 101, or can be installed on the image forming apparatus 101 after being shipped out.

Furthermore, credential information can be a digital certificate or a key pair including a private key and a public key or can be a predetermined data value, so that the substance of credential information has no limitation. Credential information can be a substance which differs for each application.

The credential information management unit 410 provides the function of managing credential information included in the image forming apparatus 101. In the present exemplary embodiment, upon receiving an instruction from the blockchain application 406, the credential information management unit 410 passes on the credential information C 407 to the blockchain application 406. Furthermore, in the present exemplary embodiment, the PC 102 cooperates with the blockchain apparatus 111 via the image forming apparatus 101, the credential information management unit 410 is configured not to provide the credential information C 407 to the PC 102. Since, when logging in via a remote UI, the user of the PC 102 is allowed to use the blockchain application 406 based on a role which the image forming apparatus 101 has confirmed, the PC 102 does not need to establish a trust relationship beforehand with the blockchain apparatus 111.

Figure 5:
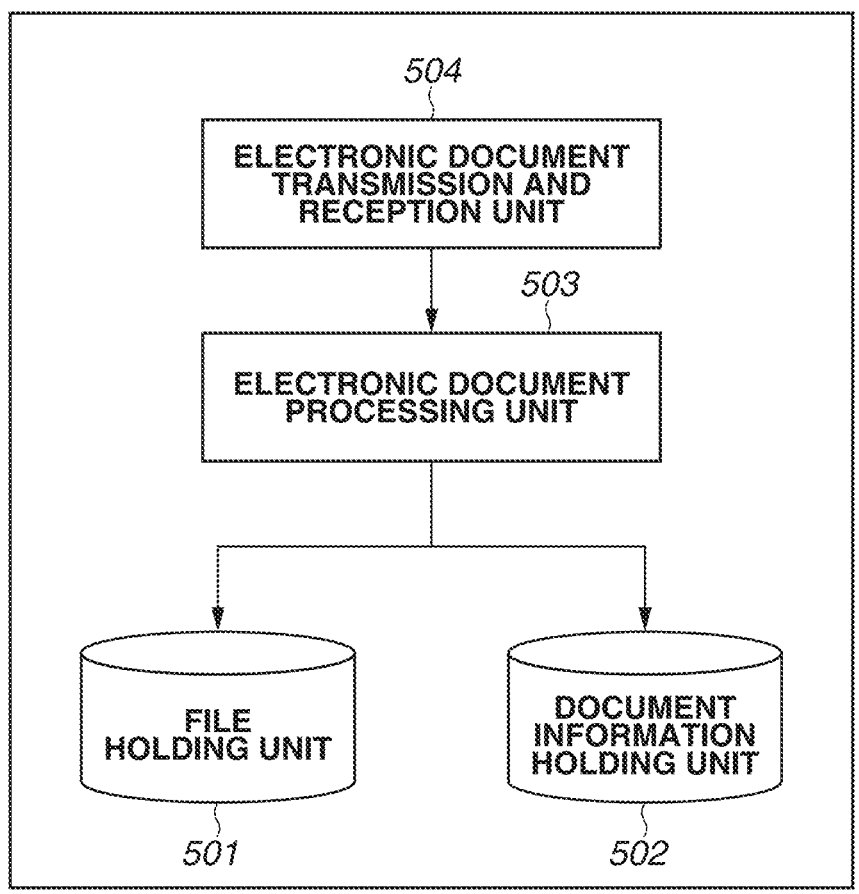
FIG. 5 is a diagram illustrating a software configuration of the document management apparatus.

FIG. 5 is a block diagram illustrating a software configuration related to the present exemplary embodiment in the document management apparatus 103. Electronic documents which the document management apparatus 103 manages include document files, which are stored in a file holding unit 501, and pieces of information indicating respective documents, which are stored in a document information holding unit 502. Data to be stored in the document information holding unit 502 is information set forth in a document information table shown in Table 3.

TABLE 3

| ID | Document name | Registration date and time | File path |
|---|---|---|---|
| 1 | Document A | 2019 May 20 12:00:00 | D:\Document\document0001.pdf |
| 2 | Documen B | 2019 May 21 13:00:00 | D:\Document\document0002.pdf |
| 3 | Document C | 2019 May 22 12:30:00 | D:\Document\document0003.pdf |

The document information table shown in Table 3 is configured with columns "ID", "document name", "registration date and time", and "file path". The column "ID" indicates identification information for uniquely managing an electronic document. The column "document name" indicates a name which is allocated for the user to discriminate an electronic document. The document name can overlap between a plurality of electronic documents. The column "registration date and time" indicates a date and time at which an electronic document was stored in the document management apparatus 103. The column "file path" indicates a location at which a document file stored in the file holding unit 501 is stored. In the present exemplary embodiment, the file path is expressed as a path on a file system, but does not need to be a path as long as it is information uniquely representing a storage location.

While these columns are configured with minimum items required for describing the present exemplary embodiment, for example, information for classifying documents can be additionally stored. An electronic document processing unit 503 has the function of accessing the file holding unit 501 and the document information holding unit 502 and controlling processing operations such as registration and acquisition of an electronic document and acquisition of a list. These processing operations to be performed by the electronic document processing unit 503 can be performed by being started up by an electronic document transmission and reception unit 504 having received a request for input-output processing about an electronic document from the outside of the document management apparatus 103, such as the image forming apparatus 101 or the PC 102.

FIG. 6 is a block diagram illustrating data structures of a transaction 601 and blocks each storing a plurality of such transactions, which are stored in the blockchain apparatus 111. The blockchain apparatus 111 is an apparatus which manages data in a formation called a blockchain. The blockchain treats information in units of transactions, and manages the transactions in units of blocks each containing a plurality of transactions.

Since each block has a defined association with blocks occurring before and after the block, the respective blocks are configured in such a way as to maintain a beaded state. Moreover, the blockchain is managed by a plurality of computers called nodes, and has a decentralized equipment configuration in which all of the nodes manage equal block data. Therefore, since, in the case of tampering with block data, updating has to be performed on a plurality of nodes constituting the blockchain, the blockchain is known as a data management method strong in anti-tampering property. Furthermore, the blockchain apparatus 111 is described as a single apparatus, but is actually an apparatus composed of a plurality of computers as mentioned above, and the blockchain service is provided by the plurality of computers.

In the present exemplary embodiment, during processing of an electronic document by the image forming apparatus 101, a transaction representing the electronic document is transmitted to the blockchain apparatus 111 and is then subjected to block management, so that a correct state of the electronic document is held. This enables checking whether no tampering has been performed on an electronic document stored in the document management apparatus 103.

A transaction 601, which represents processing for registration and outputting of an electronic document with the document management apparatus 103, includes the following six pieces of information. A document hash value 602 is a hash value calculated to uniquely represent a target electronic document. The document hash value 602 is a value calculated from the entire electronic document, so that a value to be calculated changes according to a change being made to the electronic document itself. However, a method for calculation other than the above-mentioned method can be employed without being limited.

Document identification information 603 is information which is held to be associated with an electronic document managed in the document management apparatus 103, and, in the present exemplary embodiment, stores an ID value shown in Table 3. Registration device identification information 604 is information for identifying an image forming apparatus 101 which has performed document registration, and, in the present exemplary embodiment, stores a hash value of the credential information C 407. A document registration date and time 605 is information representing a point of time at which a document was registered, and, in the present exemplary embodiment, stores a value of the registration date and time shown in Table 3.

A document registrant 606 is information representing a user who has performed document registration, and, in the present exemplary embodiment, stores a hash value of the user name of a user who has logged in to the image forming apparatus 101. Here, since information about, for example, a user name which is previously registered to use the image forming apparatus 101 is able to be directly used as information to be registered with the blockchain apparatus 111, an administrative work load on the administrator of the system can be reduced. A source document hash value 607 is information representing an association between documents. The source document hash value 607 is used, in a case where, for example, printing or electronic data save has been performed on an electronic document stored in the document management apparatus 103, to perform association with a source electronic document.

Next, a structure of a block which holds the transaction 601 is described with reference to a block 611. The block 611 is obtained by schematizing a general blockchain structure. The block 611 holds a plurality of transactions 601(a) to 601(c) and a block hash value 612 calculated from these transactions 601.

While, in the present exemplary embodiment, the number of transactions 601 included in a block is set to three, the number of transactions is not limited. Moreover, the block 611 further holds a previous block hash value 613. In the present exemplary embodiment, a block hash value of a block 614 is stored in the previous block hash value 613, thus indicating that the respective blocks have an association with each other. While, in the present exemplary embodiment, a previous block hash value is configured to be stored in each block, a configuration in which a subsequent block hash value is managed or both a previous block hash value and a subsequent block hash value are managed can be employed.

Figure 7B:
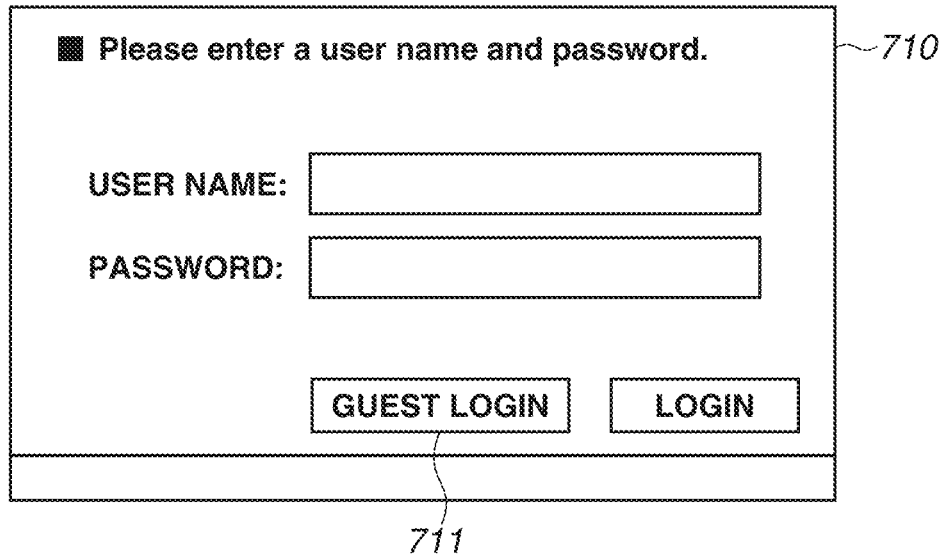

FIGS. 7A and 7B are diagrams illustrating examples of authentication screens. The authentication screen 700 illustrated in FIG. 7A is a screen used to provide the function of allowing the user to perform user authentication to use a function of the image forming apparatus 101. A user name entry field 701 is a field into which the user of the image forming apparatus 101 enters a user name. A password entry field 702 is a field into which the user of the image forming apparatus 101 enters a password.

A login button 703 is a button used to initiate user authentication. When the user presses the login button 703, the user authentication processing unit 402 performs user authentication based on values entered in the user name entry field 701 and the password entry field 702.

The authentication screen (guest login) 710 illustrated in FIG. 7B is an example of an authentication screen in which guest login is provided, and is a screen used to provide the function of allowing the user to perform user authentication to use a function of the image forming apparatus 101. In the following description, only differences from the authentication screen 700 are described.

A guest login button 711 is a button used to initiate user authentication as a guest user. When the user presses the guest login button 711, the user authentication processing unit 402 permits login without performing authentication using a user name and a password. The user, who has logged in by pressing the guest login button 711, is set to have a user name of "guest" and a role of "guest user", so that the functions which the user is allowed to use are limited according to the authority set forth in the role information table shown in Table 2. Furthermore, in the present exemplary embodiment, although details are omitted from description, the user authentication processing unit 402 can be set to switch which of the authentication screen 700 and the authentication screen (guest login) 710 to display.

Figure 8A:
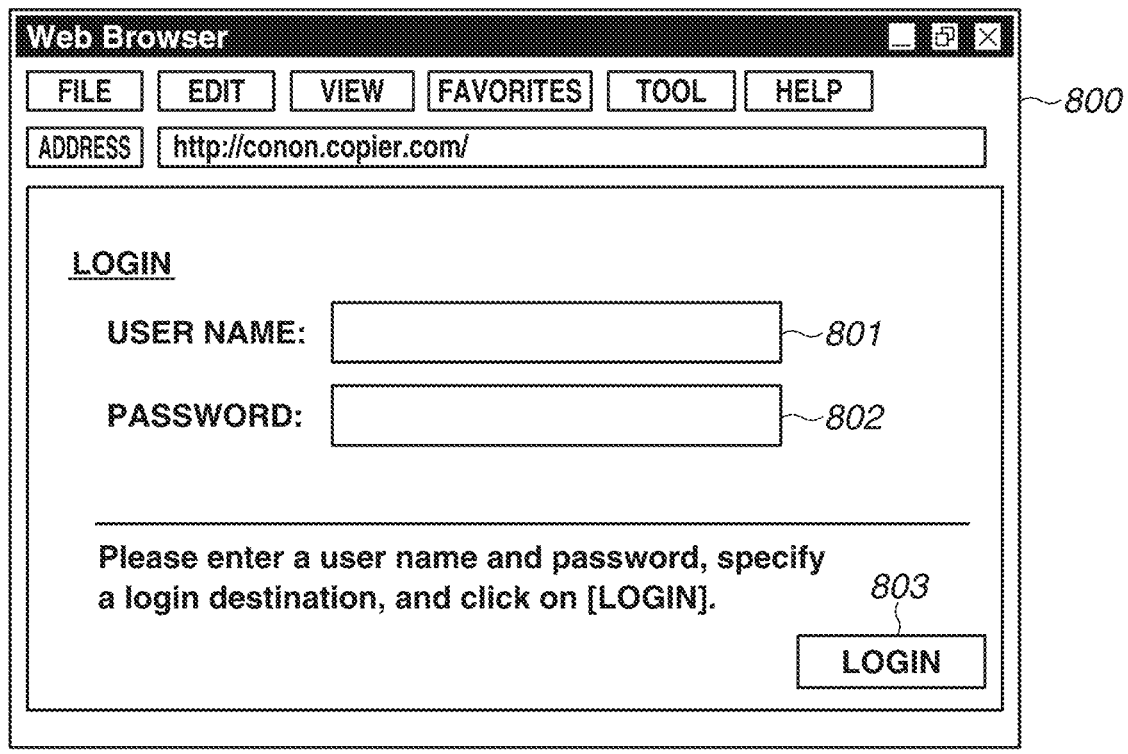
FIGS. 8A and 8B are diagrams illustrating examples of remote authentication screens.
Figure 8B:
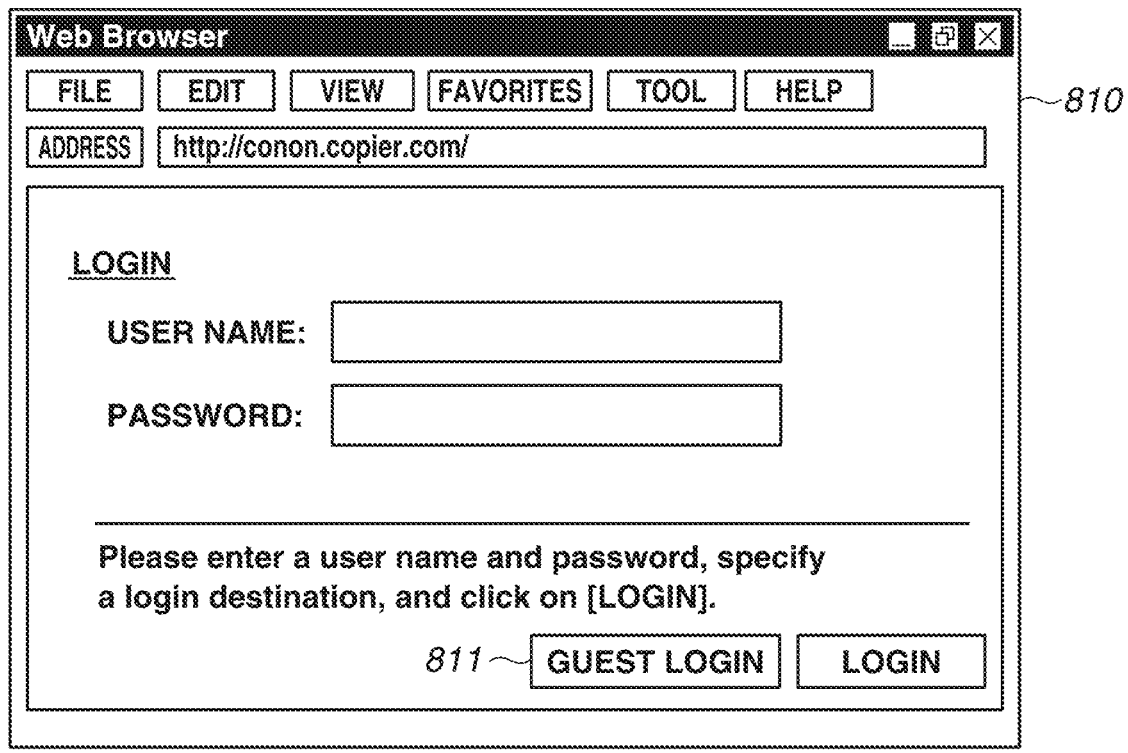

FIGS. 8A and 8B are diagrams illustrating examples of remote authentication screens. The remote authentication screen 800 illustrated in FIG. 8A is a screen used to perform user authentication for the user to use a function of the image forming apparatus 101 via a web browser on the PC 102. A user name entry field 801 is a field into which the user of the image forming apparatus 101 enters a user name. A password entry field 802 is a field into which the user of the image forming apparatus 101 enters a password.

A login button 803 is a button used to initiate user authentication. When the user presses the login button 803, the user authentication processing unit 402 performs user authentication based on values entered in the user name entry field 801 and the password entry field 802.

The remote authentication screen (guest login) 810 illustrated in FIG. 8B is a screen used to provide the function of allowing the user to perform user authentication to use a function of the image forming apparatus 101. In the following description, only differences from the remote authentication screen 800 are described.

A guest login button 811 is a button used to initiate user authentication as a guest user. When the user presses the guest login button 811, the user authentication processing unit 402 permits login without performing authentication using a user name and a password. The user, who has logged in by pressing the guest login button 811, is set to have a user name of "guest" and a role of "guest user", so that the functions which the user is allowed to use are limited according to the authority set forth in the role information table shown in Table 2.

Furthermore, in the present exemplary embodiment, although details are omitted from description, the user authentication processing unit 402 can be set to switch which of the remote authentication screen 800 and the remote authentication screen (guest login) 810 to display.

FIGS. 9A and 9B are diagrams illustrating examples of function selection screens which the local UI control unit 400 and the remote UI control unit 401 display, respectively. Each of the function selection screens illustrated in FIGS. 9A and 9B indicates a list of functions included in the image forming apparatus 101. The user of the image forming apparatus 101 is able to press a button displayed in each screen to use each function included in the image forming apparatus 101.

The function selection screen 900 illustrated in FIG. 9A is a screen which is displayed on the operation unit 209 by the local UI control unit 400 immediately after login is performed via the authentication screen 700 or the authentication screen (guest login) 710. Function selection buttons 901 are buttons operable to use the respective functions of the image forming apparatus 101.

A copy button is a button used to display a screen operable to use a copy function, a transmission button is a button used to display a screen operable to use the function of transmitting a scanned document to the PC 102, and a storage button is a button used to display a screen operable to use the function of storing a scanned electronic document in the HDD 204. While, in the present exemplary embodiment, screens which are displayed after the respective buttons are pressed are omitted from description, conventional screens can be employed.

When a document registration button is pressed, the registration screen 1000 or the registration screen 1010 is displayed. When a registered document storage/printing button is pressed, the registered document storage/printing screen 1100 is displayed. When a document verification button is pressed, the verification screen 1200 is displayed.

A logout button 902 is a button used to perform logout processing, which is displayed during login. When the logout button 902 is pressed, logout processing is performed, and, after that, the authentication screen 700 or the authentication screen (guest login) 710 is displayed.

The function selection screen 910 illustrated in FIG. 9B is an example of a screen which is displayed on a web browser on the PC 102 by the remote UI control unit 401 immediately after login is performed via the remote authentication screen 800 or the remote authentication screen (guest login) 810.

Function selection buttons 911 are buttons operable to use the respective functions. A screen which is displayed after a storage button is pressed is omitted from description, as with the function selection screen 900. When a document registration button is pressed, the registration screen 1020 or the registration screen 1030 is displayed. When a registered document storage/printing button is pressed, the registered document storage/printing screen 1110 is displayed. When a document verification button is pressed, the verification screen 1210 is displayed.

Furthermore, the selection of functions is not limited to this configuration, and, for example, a configuration in which the application A 404 is displayed in the function selection screen 900 and functions such as registration and printing are allowed to be selected after the application A 404 is selected can be employed.

FIGS. 10A, 10B, 10C, and 10D are diagrams illustrating examples of document registration screens which the application A 404 and the application B 405 display. In the present exemplary embodiment, the application A 404 displays a screen on the operation unit 209 and a web browser on the PC 102 via the local UI control unit 400 and the remote UI control unit 401, and the application B 405 displays a screen on only a web browser on the PC 102.

Furthermore, the application B 405 can also display a screen on both the operation unit 209 and a web browser on the PC 102.

The registration screen 1000 illustrated in FIG. 10A is a screen used to provide the function of registering a document with the blockchain apparatus 111 and the document management apparatus 103. A document selection setting 1001 is a setting for selecting a document targeted for registration from a scanned paper document or a document stored in the image forming apparatus 101, and thus enables selecting either "scan" or "stored document". A scan setting 1002 includes various settings regarding scan.

A blockchain button 1003 is a button used to select whether to register information about a document with the blockchain apparatus 111. In a case where the blockchain button 1003 is selected, it is selected to register information about a document with the blockchain apparatus 111, and, in a case where the blockchain button 1003 is not selected, it is not selected to register information about a document with the blockchain apparatus 111.

In a case where "scan" is selected at the document selection setting 1001, a register button 1004 is used to perform scanning of a document to generate an electronic document. In a case where "stored document" is selected, the register button 1004 is used to display a list of stored documents and acquire a document selected by the user from the list. After that, in a case where the blockchain button 1003 is selected, the register button 1004 is used to register the electronic document with the document management apparatus 103 and register information about the electronic document with the blockchain apparatus 111. In a case where the blockchain button 1003 is not selected, the register button 1004 is used to register the electronic document with the document management apparatus 103 without registering information about the electronic document with the blockchain apparatus 111. A storage destination setting 1005 is a setting used to designate in which path of the document management apparatus 103 to store a document.

Figure 10B:
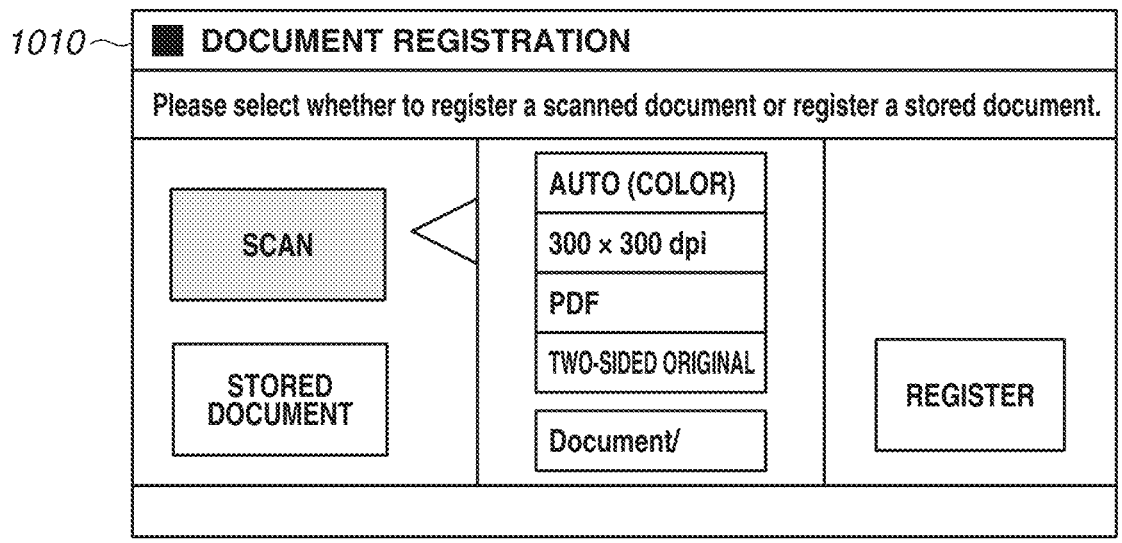

The registration screen 1010 illustrated in FIG. 10B is a screen used to provide the function of registering a document with the document management apparatus 103, and is a screen which is displayed to, for example, a user who has guest-logged in. Since, in the present exemplary embodiment, the guest user does not have the authority of registering document information with the blockchain apparatus 111, the registration screen 1010 differs from the registration screen 1000 in that the blockchain button 1003 is not displayed. Furthermore, the registration screen 1010 illustrated in FIG. 10B can be displayed in a case where a role allowed to use a blockchain service is not allocated to the user.

The registration screen 1020 illustrated in FIG. 10C is a screen used to provide the function of registering a document with the blockchain apparatus 111 and the document management apparatus 103, and is an example of a screen which is displayed on a web browser on the PC 102.

Figure 10D:
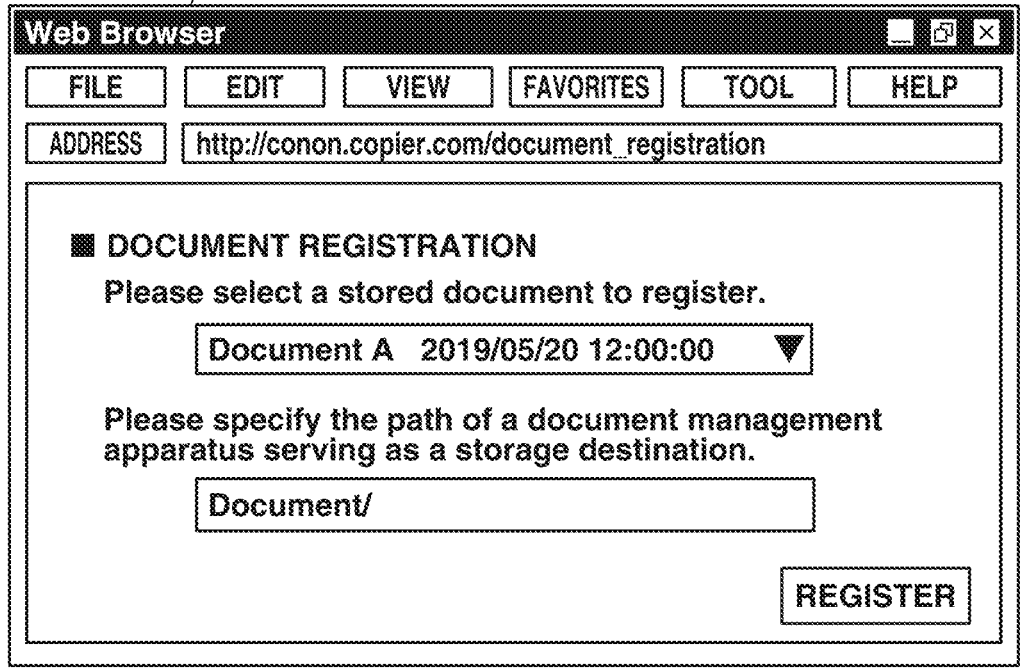

The registration screen 1030 illustrated in FIG. 10D is a screen used to provide the function of registering a document with the document management apparatus 103, and is a screen which is displayed on a web browser on the PC 102 to, for example, a user who has guest-logged in. Furthermore, the registration screen 1030 illustrated in FIG. 10D can be displayed in a case where a role allowed to use a blockchain service is not allocated to the user.

FIGS. 11A and 11B are diagrams illustrating examples of screens used to store or print a registered document, which the application A 404 displays. The registered document storage/printing screen 1100 illustrated in FIG. 11A is a screen used to provide the function of storing or printing a document managed by the blockchain apparatus 111 and the document management apparatus 103.

A document selection list 1101 is a list used to select a document to be stored or printed, and the application A 404 displays, in the document selection list 1101, documents which are currently managed by the document management apparatus 103. A print button 1102 is a button used to perform printing of a document selected in the document selection list 1101. A store button 1103 is a button used to store a document selected in the document selection list 1101 in the HDD 204 of the image forming apparatus 101.

The registered document storage/printing screen 1110 illustrated in FIG. 11B is a screen used to provide the function of storing or printing a document managed by the blockchain apparatus 111 and the document management apparatus 103, and is an example of a screen which is displayed on a web browser on the PC 102.

FIGS. 12A and 12B are diagrams illustrating examples of screens used to verify a document which the application A 404 displays. The verification screen 1200 illustrated in FIG. 12A is a screen used to provide the function of verifying that a scanned document or a document stored in the image forming apparatus 101 is a right document, with use of the blockchain apparatus 111.

A document selection setting 1201 is a setting used to select a document targeted for verification from a paper document or a document stored in the image forming apparatus 101. A document selection list 1202 is a list used to select a document targeted for verification, and is a list of documents which are currently stored in the HDD 204. A verify button 1203 is a button used to perform scanning of a document in a case where "scan" is selected in the document selection setting 1201 and, after that, perform verification of the document with use of the blockchain apparatus 111. In a case where "stored document" is selected in the document selection setting 1201, the verify button 1203 is used to verify a document selected in the document selection list 1202.

The verification screen 1210 illustrated in FIG. 12B is a screen used to provide the function of verifying that a document stored in the HDD 204 is a right document, with use of the blockchain apparatus 111, and is an example of a screen which is displayed on a web browser on the PC 102.

Figure 13:
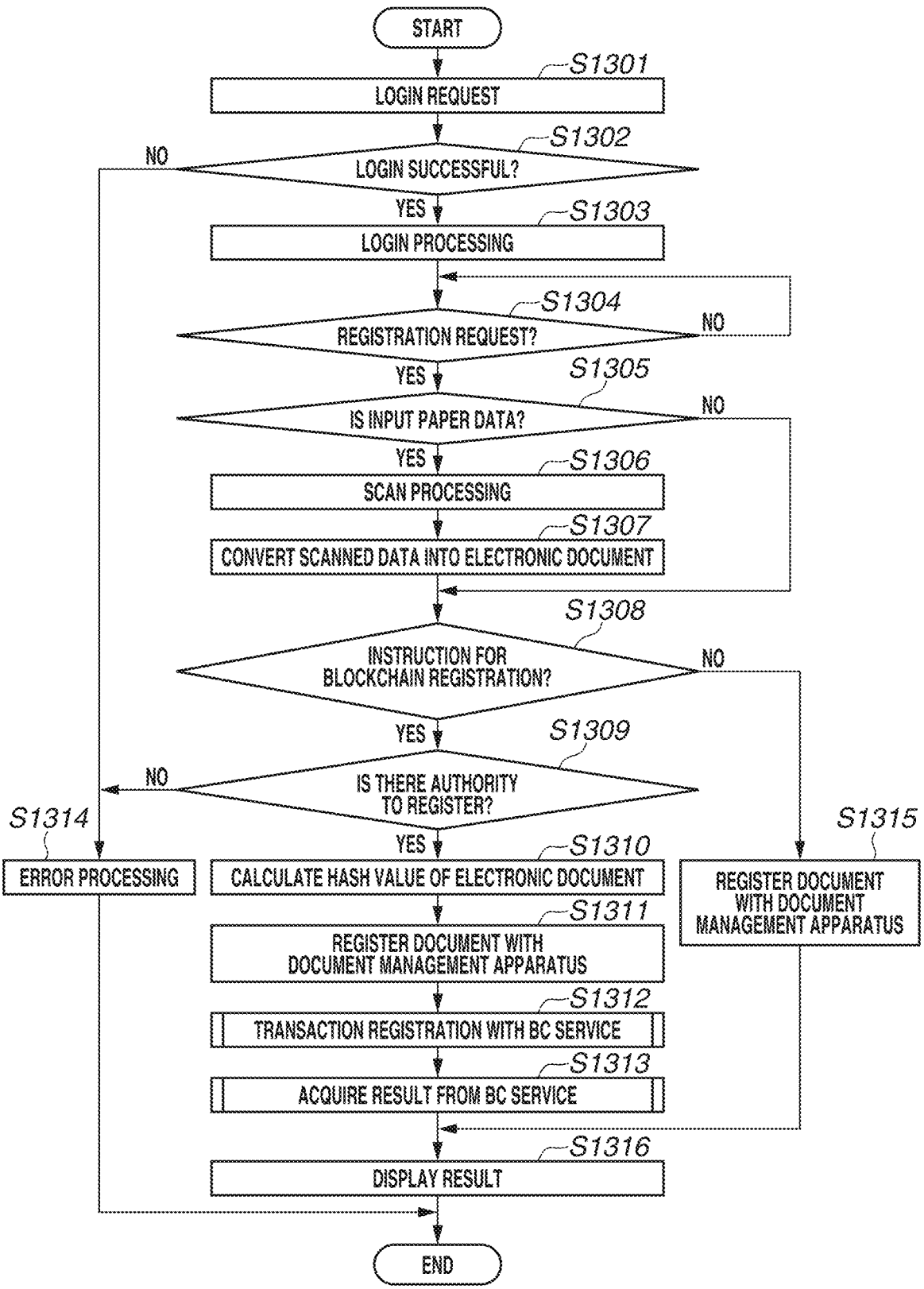
FIG. 13 is a flowchart illustrating processing for registering information about a document with the blockchain apparatus.

FIG. 13 is a flowchart illustrating processing for registering information about a document with the blockchain apparatus 111 in the image forming apparatus 101. While, in the present exemplary embodiment, a case where the user uses the image forming apparatus 101 via the control unit 200 is described, the user can use the image forming apparatus 101 via a web browser on the PC 102. The present flowchart is started by the login button 703 being pressed in the authentication screen 700, and, first, the user authentication processing unit 402 is executed by the CPU 201.

At the time of starting of the present flowchart, a user name and a password entered by the user of the image forming apparatus 101 via the authentication screen 700 are passed to the user authentication processing unit 402. In step S1301, the user authentication processing unit 402 receives the user name and the password as a login request.

In step S1302, the user authentication processing unit 402 checks whether the received user name and password match a user name and password included in the user information table shown in Table 1, and, if it is determined that the received user name and password match a user name and password included in the user information table (YES in step S1302), the user authentication processing unit 402 determines that the user authentication is successful and then advances the processing to step S1303. If it is determined that the received user name and password do not match a user name and password included in the user information table (NO in step S1302), the user authentication processing unit 402 determines that the user authentication is failed and then advances the processing to step S1314.

In step S1303, the user authentication processing unit 402 performs login processing to store the user name received in step S1301 as the currently logged-in user in the RAM 203, and then passes the processing to the local UI control unit 400. The local UI control unit 400, which has taken over the processing, displays the function selection screen 900 on the operation unit 209. In the present flowchart, after that, in the function selection screen 900, the document registration button is pressed by the user, and, with respect to the subsequent processing, the application A 404 is executed by the CPU 201.

The application A 404, which has taken over the processing, displays a screen in which function restriction is reflected based on a role of the currently logged-in user. Specifically, in a case where the user name of the logged-in user is "guest", since the corresponding role "guest user" is inhibited from performing BC registration, the application A 404 displays, on the operation unit 209, the registration screen 1010, in which the document registration function in the blockchain apparatus 111 is restricted. In a case where the user name of the logged-in user is other than "guest", since the corresponding role is allowed to perform BC registration, the application A 404 displays the registration screen 1000 on the operation unit 209.

In step S1314, the user authentication processing unit 402 performs error processing to display, on the operation unit 209 via the operation unit IF 205, the failure of user authentication or the absence of an authority to use the blockchain apparatus 111, and then ends the processing. In step S1304, the application A 404 waits for the blockchain button 1003 for registration to be pressed in the registration screen 1000, and, if it is determined that the blockchain button 1003 has been pressed (YES in step S1304), the application A 404 advances the processing to step S1305.

In step S1305, if it is determined that "scan" has been selected in the registration screen 1000 (YES in step S1305), the application A 404 advances the processing to step S1306, and, if it is determined that "stored document" has been selected (NO in step S1305), the application A 404 advances the processing to step S1308. In step S1306, the application A 404 performs scan processing on a paper document with use of the scanner 211. In step S1307, the application A404 generates an electronic document from data obtained by scanning in step S1306 according to the scan setting 1002, and temporarily stores the generated electronic document in the HDD 204. The application A 404 deletes such temporary data at the time of ending of the present flowchart.

In step S1308, the application A 404 determines whether an instruction for blockchain registration is issued. In the present exemplary embodiment, in a case where the user name of the logged-in user is other than "guest" and the blockchain button 1003 has been selected in the registration screen 1000 (YES in step S1308), the application A 404 advances the processing to step S1309. In a case where the user name of the logged-in user is "guest" or in a case where the user name of the logged-in user is other than "guest" but the blockchain button 1003 has not been selected in the registration screen 1000 (NO in step S1308), the application A 404 advances the processing to step S1315.

In step S1309, the application A 404 checks whether the user of the image forming apparatus 101 has authority to use the blockchain apparatus 111, and, if it is determined that the user has such authority (YES in step S1309), the application A 404 advances the processing to step S1310, and, if it is determined that the user does not have such authority (NO in step S1309), the application A 404 advances the processing to step S1314. Furthermore, in order to allow only a legitimate user of the image forming apparatus 101 to use the blockchain apparatus 111, a method in which the user is deemed to have authority in a case where the role of the user name held in step S1303 is not "guest user" can also be employed. Moreover, with regard to the authority to use the blockchain apparatus 111, a role exclusively used for blockchain can be prepared as mentioned above and the presence or absence of such authority can be determined based on the prepared role.

In step S1310, the application A 404 calculates a hash value of the electronic document generated in step S1307. In step S1311, the application A 404 requests the document management apparatus 103 to register the electronic document generated in step S1307, and, as a result, acquires an ID representing the electronic document completed for registration and date and time information representing the date and time at which registration was completed.

While, until step S1311, the processing is performed by the application A 404, in step S1312, the processing is performed by the blockchain application 406. In step S1312, the blockchain application 406 registers the electronic document with the blockchain apparatus 111. Processing for registration with the blockchain apparatus 111 is described below with reference to FIG. 17. Here, values to be designated to the transaction 601 for registration and credential information are described.

The hash value calculated in step S1310 is designated as the document hash value 602. The ID representing the electronic document received in step S1311 is designated as the document identification information 603. A hash value of the credential information C 407 of the image forming apparatus 101 which has performed printing is designated as the registration device identification information 604. The date and time information representing the date and time at which registration was completed received in step S1311 is designated as the document registration date and time 605. A hash value of the user name of the user who is logged in to the image forming apparatus 101 in which a registration operation has been performed is designated as the document registrant 606. Furthermore, since, in the present flow, there is no source document, no value is designated as the source document hash value 607.

The application A 404 also passes the credential information A 408 to the blockchain application 406 in addition to the values to be designated to the transaction 601. The credential information A 408 is used by the blockchain application 406 to verify that a series of processing operations concerning registration is being performed by a legitimate application.

In step S1313, the application A 404 acquires, from the blockchain application 406, a result of registration processing with the blockchain apparatus 111. In step S1315, the application A 404 performs the same processing as that in step S1311, and then advances the processing to step S1316. Thus, it is also possible to perform usual document registration without performing blockchain registration.

In step S1316, the application A 404 displays the result of registration processing acquired in step S1313 on the operation unit 209 via the operation unit I/F 205. In this respect, the application A 404 displays, on a screen, information (not illustrated) about, for example, the success or failure of registration with the document management apparatus 103 or the success or failure of registration with the blockchain apparatus 111. After that, the application A 404 ends the processing.

Figure 14:
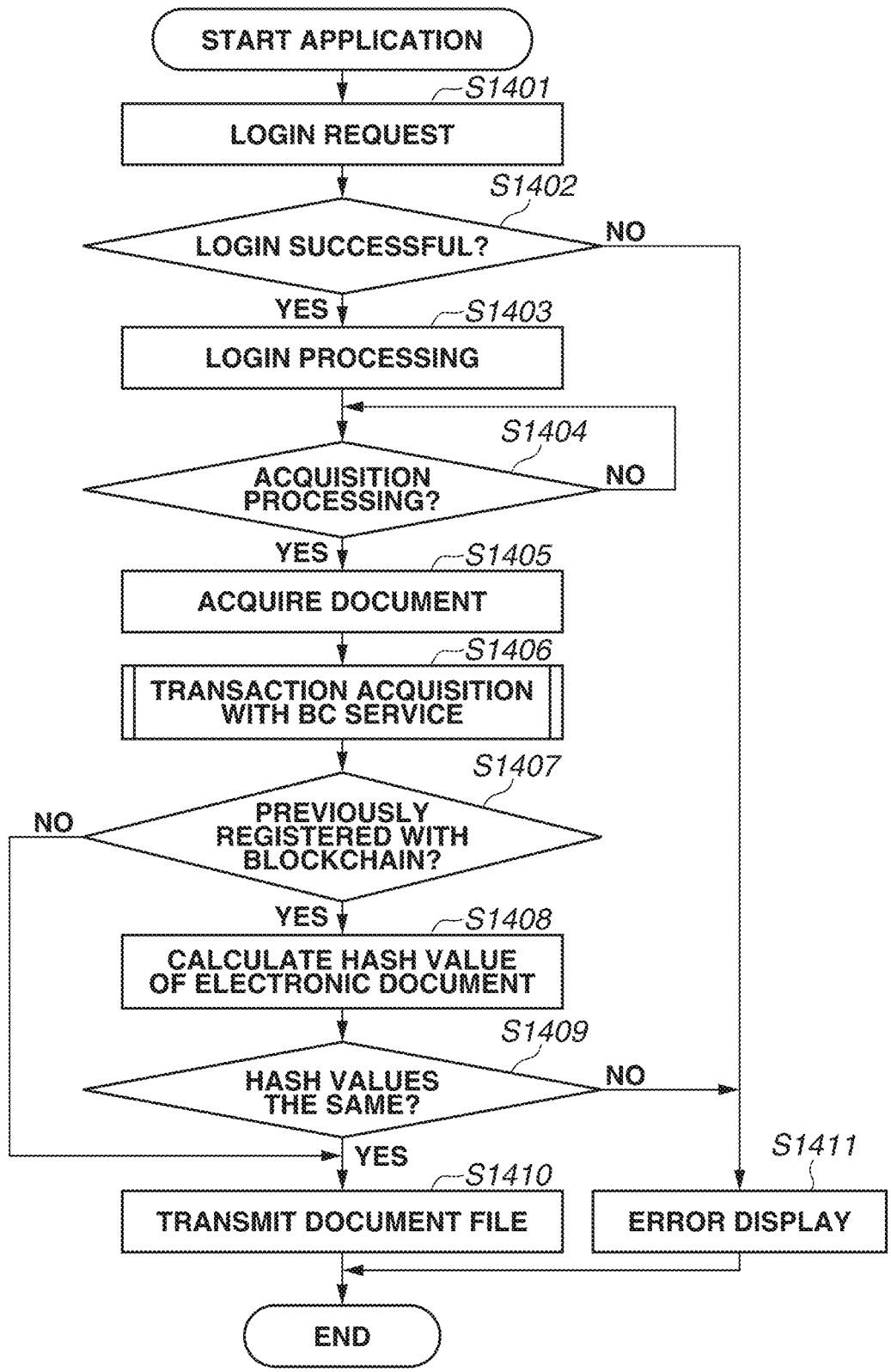
FIG. 14 is a flowchart illustrating processing for acquiring an electronic document from the document management apparatus and storing the acquired electronic document.

FIG. 14 is a flowchart illustrating processing for storing, in the image forming apparatus 101, an electronic document stored in the document management apparatus 103. While, in the present exemplary embodiment, a case where the user uses the image forming apparatus 101 via the control unit 200 is described, the user can use the image forming apparatus 101 via a web browser on the PC 102. The present flowchart is started by the login button 703 being pressed in the authentication screen 700, and, first, the user authentication processing unit 402 is executed by the CPU 201.

At the time of starting of the present flowchart, a user name and a password entered by the user of the image forming apparatus 101 via the authentication screen 700 are passed to the user authentication processing unit 402. In step S1401, the user authentication processing unit 402 receives the user name and the password as a login request. In step S1402, the user authentication processing unit 402 checks whether the received user name and password match a user name and password included in the user information table shown in Table 1, and, if it is determined that the received user name and password match a user name and password included in the user information table (YES in step S1402), the user authentication processing unit 402 determines that the user authentication is successful and then advances the processing to step S1403. If it is determined that the received user name and password do not match a user name and password included in the user information table (NO in step S1402), the user authentication processing unit 402 determines that the user authentication is failed and then advances the processing to step S1411.

In step S1403, the user authentication processing unit 402 performs login processing to store the user name received in step S1401 as the currently logged-in user in the RAM 203, and then passes the processing to the local UI control unit 400. The local UI control unit 400, which has taken over the processing, displays the function selection screen 900 on the operation unit 209. In the present flowchart, after that, in the function selection screen 900, the registered document storage/printing button is pressed by the user, and, with respect to the subsequent processing, the application A 404 is executed by the CPU 201. The application A 404, which has taken over the processing, displays the registered document storage/printing screen 1100 on the operation unit 209.

In step S1404, the application A 404 displays the registered document storage/printing screen 1100 illustrated in FIG. 11A on the operation unit 209 via the operation unit I/F 205 and waits for the store button 1103 to be pressed, and, if it is determined that the store button 1103 has been pressed (YES in step S404), the application A 404 advances the processing to step S1405.

In step S1405, the application A 404 acquires, from the image forming apparatus 101, an electronic document selected in the document selection list 1101 displayed in the registered document storage/printing screen 1100. The application A 404 temporarily stores document information about the acquired electronic document in the RAM 203 and temporarily stores a document file of the acquired electronic document in the HDD 204.

While, until step S1405, the processing is performed by the application A 404, in step S1406, the processing is performed by the blockchain application 406. In step S1406, the blockchain application 406 acquires a transaction 601 which holds, in the document identification information 603 thereof, an ID of the document information stored in the RAM 203. Such acquisition processing is described below with reference to FIG. 17.

Here, the application A 404 passes the credential information A 408 to the blockchain application 406. The credential information A 408 is used by the blockchain application 406 to verify that a series of processing operations concerning acquisition of an electronic document is being performed by a legitimate application.

In step S1407, the application A 404 determines whether the applicable transaction information has been acquired in step S1406. If it is determined that the applicable transaction information is not present (NO in step S1407), since the applicable transaction information is not information which is not currently managed by the blockchain apparatus 111, the application A 404 advances the processing to step S1410. If it is determined that the applicable transaction information is present (YES in step S1407), the application A 404 advances the processing to step S1408.

In step S1408, the application A 404 calculates a hash value of the document data stored in the HDD 204. In step S1409, the application A 404 determines whether the calculated hash value is the same as the document hash value 602 of the transaction information acquired in step S1406. If it is determined that the respective hash values are not the same value (NO in step S1409), since the document file stored in the document management apparatus 103 is invalid data, the application A 404 advances the processing to step S1411 for error display. If it is determined that the respective hash values are the same value (YES in step S1409), the application A 404 advances the processing to step S1410.

In step S1410, the application A 404 transfers the document data temporarily stored in the HDD 204 in step S1405 to a legitimate storage location inside the HDD 204. While, in the present exemplary embodiment, a configuration in which the document data is stored in the HDD 204 of the image forming apparatus 101 is employed, a configuration in which a path of the storage destination is allowed to be designated in the registered document storage/printing screen 1100 and the document data is stored in the designated location can be employed.

In step S1411, the user authentication processing unit 402 performs error display indicating a case where acquisition processing is not permitted in the present flowchart. In this respect, the user authentication processing unit 402 displays an error dialog (not illustrated) on the operation unit 209. At this time, the user authentication processing unit 402 deletes the document file temporarily stored in the HDD 204.

Figure 15:
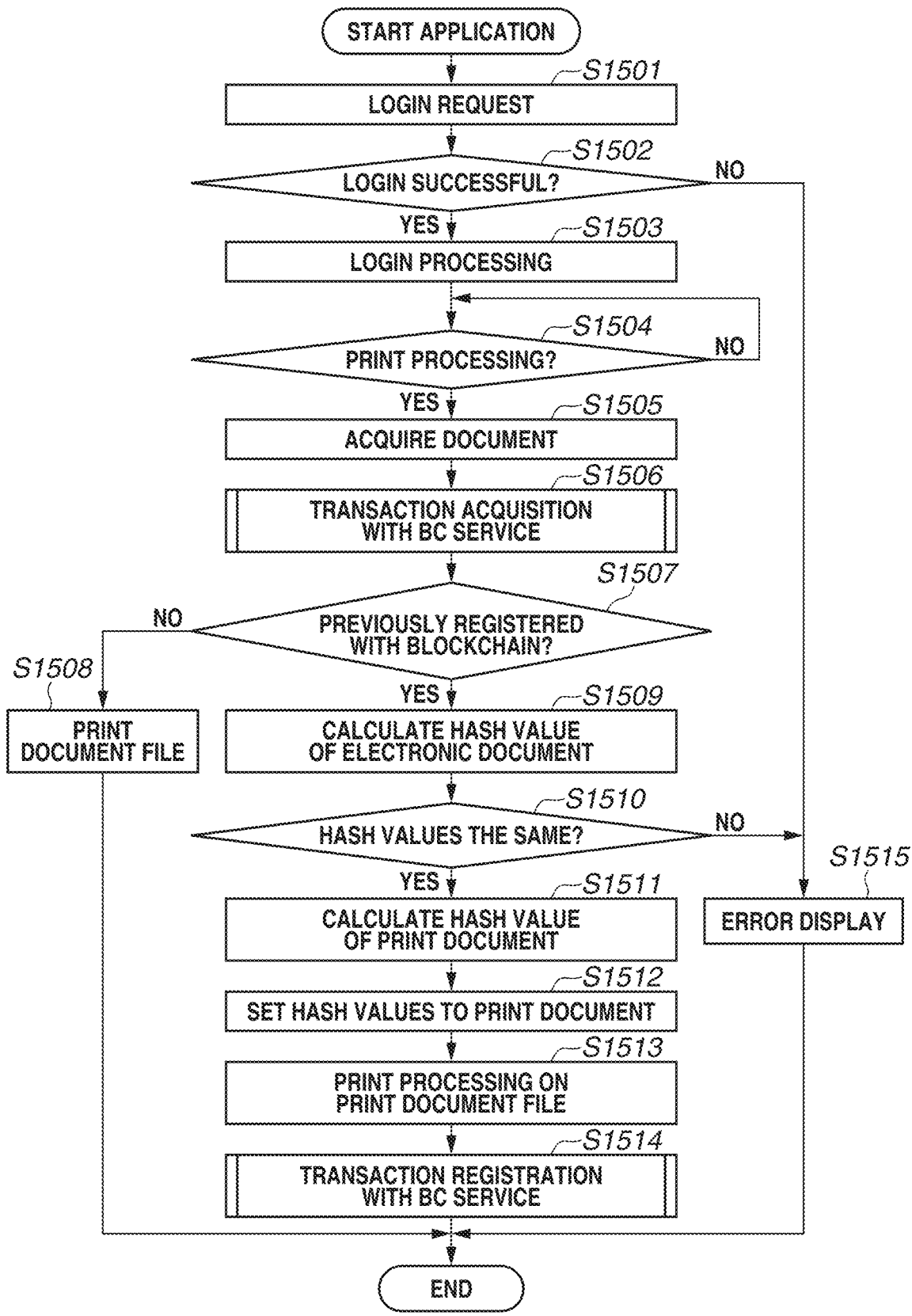
FIG. 15 is a flowchart illustrating processing for printing an electronic document by the image forming apparatus.

FIG. 15 is a flowchart illustrating processing for printing an electronic document, which is stored in the document management apparatus 103, by the image forming apparatus 101. While, in the present exemplary embodiment, a case where the user uses the image forming apparatus 101 via the control unit 200 is described, the user can use the image forming apparatus 101 via a web browser on the PC 102. The present flowchart is started by the login button 703 being pressed in the authentication screen 700, and, first, the user authentication processing unit 402 is executed by the CPU 201.

At the time of starting of the present flowchart, a user name and a password entered by the user of the image forming apparatus 101 via the authentication screen 700 are passed to the user authentication processing unit 402. In step S1501, the user authentication processing unit 402 receives the user name and the password as a login request. In step S1502, the user authentication processing unit 402 checks whether the received user name and password match a user name and password included in the user information table shown in Table 1, and, if it is determined that the received user name and password match a user name and password included in the user information table (YES in step S1502), the user authentication processing unit 402 determines that the user authentication is successful and then advances the processing to step S1503. If it is determined that the received user name and password do not match a user name and password included in the user information table (NO in step S1502), the user authentication processing unit 402 determines that the user authentication is failed and then advances the processing to step S1515.

In step S1503, the user authentication processing unit 402 performs login processing to store the user name received in step S1501 as the currently logged-in user in the RAM 203, and then passes the processing to the local UI control unit 400. The local UI control unit 400, which has taken over the processing, displays the function selection screen 900 on the operation unit 209. In the present flowchart, after that, in the function selection screen 900, the registered document storage/printing button is pressed by the user, and, with respect to the subsequent processing, the application A 404 is executed by the CPU 201. The application A 404, which has taken over the processing, displays the registered document storage/printing screen 1100 on the operation unit 209.

In step S1504, the application A 404 displays the registered document storage/printing screen 1100 illustrated in FIG. 11A on the operation unit 209 via the operation unit IF 205 and waits for the print button 1102 to be pressed, and, if it is determined that the print button 1102 has been pressed (YES in step S1504), the application A 404 advances the processing to step S1505. In step S1505, the application A 404 acquires, from the image forming apparatus 101, an electronic document selected in the document selection list 1101 displayed in the registered document storage/printing screen 1100. The application A 404 temporarily stores document information about the acquired electronic document in the RAM 203 and temporarily stores a document file of the acquired electronic document in the HDD 204.

While, until step S1505, the processing is performed by the application A 404, in step S1506, the processing is performed by the blockchain application 406. In step S1506, the blockchain application 406 acquires a transaction 601 which holds, in the document identification information 603 thereof, an ID of the document information stored in the RAM 203. Such acquisition processing is described below with reference to FIG. 17.

Here, the application A 404 passes the credential information A 408 to the blockchain application 406. The credential information A 408 is used by the blockchain application 406 to verify that a series of processing operations concerning acquisition of an electronic document is being performed by a legitimate application.

In step S1507, the application A 404 determines whether the applicable transaction information has been acquired in step S1506. If it is determined that the applicable transaction information is not present (NO in step S1507), since the applicable transaction information is not information which is not currently managed by the blockchain apparatus 111, the application A 404 advances the processing to step S1508. If it is determined that the applicable transaction information is present (YES in step S1507), the application A 404 advances the processing to step S1509.

In step S1508, the application A 404 performs print processing with the printer 210 to print the document data stored in the HDD 204 via the printer I/F 206 of the image forming apparatus 101. In step S1509, the application A 404 calculates a hash value of the document data stored in the HDD 204. In step S1510, the application A 404 determines whether the calculated hash value is the same as the document hash value 602 of the transaction information acquired in step S1506. If it is determined that the respective hash values are not the same value (NO in step S1510), since the document file stored in the document management apparatus 103 is invalid data, the application A 404 advances the processing to step S1515 for error display. If it is determined that the respective hash values are the same value (YES in step S1510), the application A 404 advances the processing to step S1511.

In step S1511 the application A 404 calculates a hash value to beset for a print document. The application A 404 calculates this hash value using the document hash value 602 of the transaction information acquired in step S1506, the credential information C 407 in the image forming apparatus 101 performing processing, and date and time information in the image forming apparatus 101 at the time of processing in this step.

In step S1512, the application A 404 sets the hash value representing a print document calculated in step S1511 and the document hash value 602 of the transaction information representing a source image into a file to be printed in step S1513. The format to be set in this step is a format which is scannable when a printed sheet of paper is scanned at the time of verification described below, and can be information which is able to be determined on a printed product as a two-dimensional barcode or can be information embedded as invisible information.

In step S1513, the application A 404 performs print processing to cause the printer 210 to print the document file with the hash value set therein via the printer I/F 206 of the image forming apparatus 101. While, until step S1513, the processing is performed by the application A 404, in step S1514, the processing is performed by the blockchain application 406. In step S1514, the blockchain application 406 registers information about the print processing with the blockchain apparatus 111. This registration processing is described below with reference to FIG. 17. Here, values to be designated to the transaction 601 for registration are described.

The hash value of the print document calculated in step S1511 is designated as the document hash value 602, and the ID representing the electronic document received as an argument is designated as the document identification information 603. A hash value of the credential information C 407 of the image forming apparatus 101 which has performed printing is designated as the registration device identification information 604. The date and time information representing the date and time at which a hash value was searched for in step S1511 is designated as the document registration date and time 605. A hash value of the user name of the user who is logged in to the image forming apparatus 101 which has performed printing is designated as the document registrant 606. The document hash value 602 of transaction information representing a source image acquired in step S1506 is designated as the source document hash value 607.

Here, the application A 404 passes the credential information A 408 to the blockchain application 406. The credential information A 408 is used by the blockchain application 406 to verify that a series of processing operations concerning acquisition of an electronic document is being performed by a legitimate application. In step S1515, the user authentication processing unit 402 performs error display indicating a case where printing is not permitted in the present flowchart. In this respect, the user authentication processing unit 402 displays an error dialog (not illustrated) on the operation unit 209.

Figure 16:
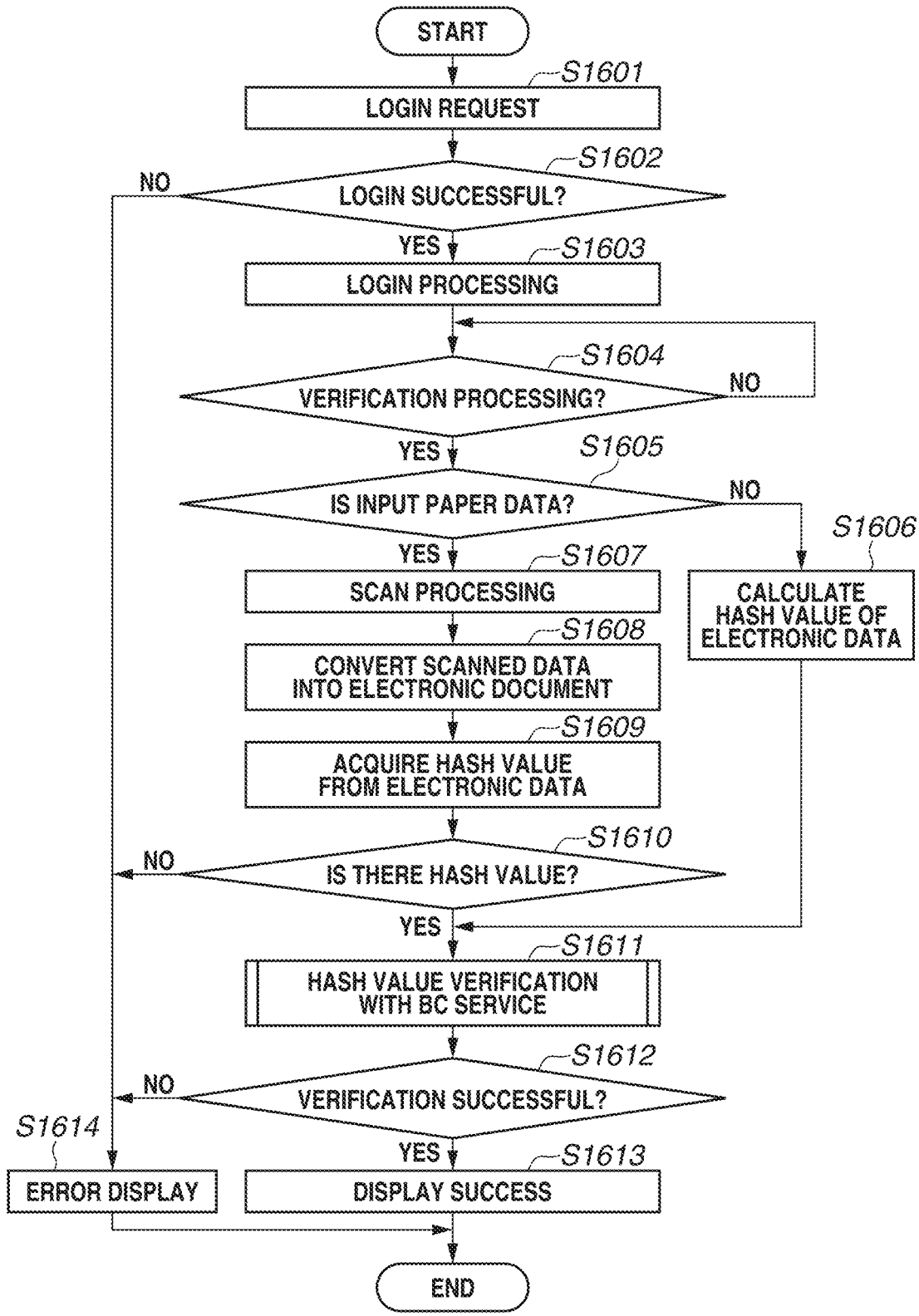
FIG. 16 is a flowchart illustrating processing for verifying an electronic document.

FIG. 16 is a flowchart illustrating processing for performing verification processing on a document file designated by the user or a printed paper document with the image forming apparatus 101. The present flowchart is started by the login button 703 or the guest login button 711 being pressed in the authentication screen 700 or 710 of the image forming apparatus 101 illustrated in FIG. 7A or 7B, and, first, the user authentication processing unit 402 is executed by the CPU 201. At the time of starting of the present flowchart, a user name and a password entered by the user of the image forming apparatus 101 via the authentication screen 700 are passed to the user authentication processing unit 402.

In step S1601, the user authentication processing unit 402 receives the user name and the password as a login request. In step S1602, the user authentication processing unit 402 checks whether the received user name and password match a user name and password included in the user information table shown in Table 1, and, if it is determined that the received user name and password match a user name and password included in the user information table (YES in step S1602), the user authentication processing unit 402 determines that the user authentication is successful and then advances the processing to step S1603. If it is determined that the received user name and password do not match a user name and password included in the user information table (NO in step S1602), the user authentication processing unit 402 determines that the user authentication is failed and then advances the processing to step S1614.

In step S1603, the user authentication processing unit 402 performs login processing to store the user name received in step S1601 as the currently logged-in user in the RAM 203, and then passes the processing to the local UI control unit 400. The local UI control unit 400, which has taken over the processing, displays the function selection screen 900 on the operation unit 209. In the present flowchart, after that, in the function selection screen 900, the document verification button is pressed by the user, and, with respect to the subsequent processing, the application A 404 is executed by the CPU 201. The application A 404, which has taken over the processing, displays the verification screen 1200 on the operation unit 209.

In step S1604, the application A 404 displays the verification screen 1200 illustrated in FIG. 12A on the operation unit 209 via the operation unit I/F 205 and waits for the verify button 1203 to be pressed, and, if it is determined that the verify button 1203 has been pressed (YES in step S1604), the application A 404 advances the processing to step S1605. In step S1605, the application A 404 determines whether the target data is paper data based on the value of the document selection setting 1201 received at the time of start-up. If it is determined that the target data is paper data (YES in step S1605), the application A 404 advances the processing to step S1607, and, if it is determined that the target data is electronic data (NO in step S1605), the application A 404 advances the processing to step S1606.

In step S1606, the application A404 identifies the selected electronic data stored in the HDD 204 and then calculates a hash value of the electronic data. The calculated hash value represents a document targeted for verification, and is used for verification processing in step S1611. In step S1607, the application A 404 performs scan processing on a paper document set on the image forming apparatus 101. In the scan processing, the application A 404 causes the scanner 211 to read the paper document via the scanner I/F 207, thus generating image data.

In step S1608, the application A 404 converts the image data generated by scanner 211 into electronic data, and then temporarily stores the electronic data in the HDD 204. The application A 404 deletes such temporary data at the time of ending of the present flowchart. In step S1609, the blockchain application 406 acquires a hash value embedded in the electronic data stored in the HDD 204 in step S1608. In this acquisition processing, the application A 404 performs processing for acquiring a hash value coordinating with the above-mentioned method in which a hash value is embedded in step S1512 in the printing flowchart described with reference to FIG. 15.

In step S1610, the application A 404 determines whether a hash value has been acquired from the electronic data. If it is determined that there is a hash value (YES in step S1610), the application A 404 advances the processing to step S1611, and, if it is determined that there is no hash value (NO in step S1610), the application A 404 advances the processing to step S1614. While, until step S1610, the processing is performed by the application A 404, in step S1611, the processing is performed by the blockchain application 406.

In step S1611, the blockchain application 406 performs document verification processing using transaction information recorded in the blockchain apparatus 111. The document verification processing is described below with reference to FIG. 17. At that time, the type of processing set as document verification, a document hash value calculated or acquired in step S1606 or step S1609, and the credential information A 408 are passed to the blockchain application 406.

In step S1612, upon receiving a response indicating a result of the requested processing, the application A 404 determines a verification result. If it is determined that verification is successful (YES in step S1612), then in step S1613, the application A 404 displays a standard dialog (not illustrated) displaying a message indicating that, for example, verification is successful. Moreover, if it is determined that verification is failed (NO in step S1612), then in step S1614, the application A 404 displays a standard dialog (not illustrated) displaying a message indicating that verification is failed or verification is unable to be performed. After displaying the applicable message, the application A 404 ends the present flowchart in response to an instruction to close the dialog been issued by the user.

Figure 17:
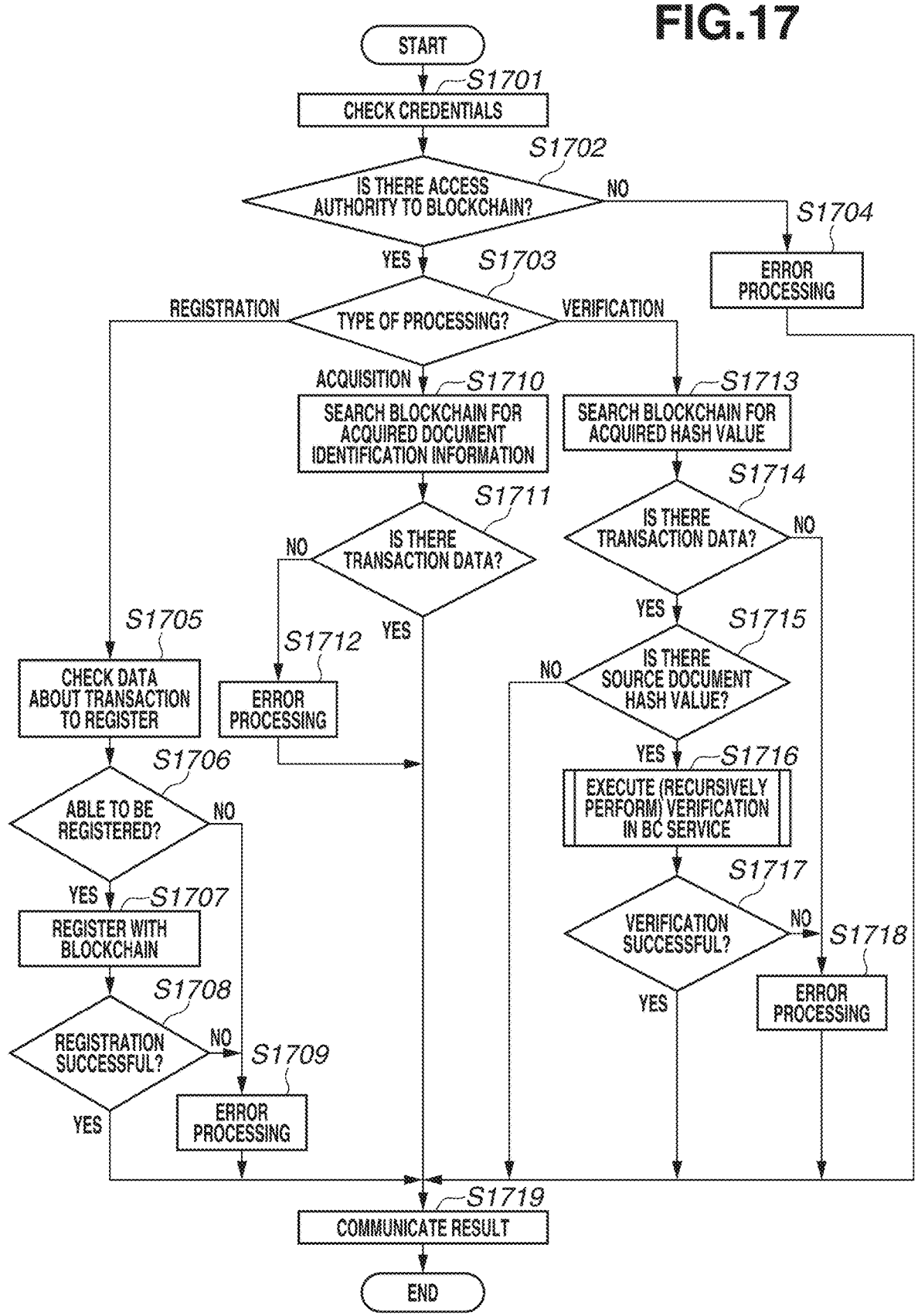
FIG. 17 is a flowchart illustrating transaction processing on the blockchain apparatus.

FIG. 17 is a flowchart illustrating transaction processing which the blockchain application 406 of the image forming apparatus 101 performs on the blockchain apparatus 111. The present flowchart is activated and executed as the blockchain application 406 during processing operations performed by the application A 404 illustrated in FIG. 13 to FIG. 16.

At the time of starting of the present flowchart, the blockchain application 406 receives, from the application A 404, the type of processing to be performed on the blockchain apparatus 111 and information required for each type of processing. The information required for each type of processing is the transaction 601 at the time of transaction registration, is the document hash value 602 at the time of document verification, and is the document identification information 603 at the time of transaction acquisition.

In step S1701, the blockchain application 406 passes the credential information C 407 and the credential information A 408 to the blockchain apparatus 111 to check the correctness of credential information. Here, credential information acquired from the credential information management unit 410 at the time of start-up of the blockchain application 406 is used as the credential information C 407, and credential information acquired from the application A 404 is used as the credential information A 408.

In step S1702, the blockchain application 406 determines whether the credential information checked in step S1701 is correct credential information. With respect to determination as to whether the checked credential information is correct credential information, in a case where the credential information is a digital certificate, when the certificate is verified and verification is successful, the blockchain application 406 determines that the checked credential information is correct credential information. Moreover, in a case where the credential information is a predetermined data value, when the values match each other, the blockchain application 406 determines that the checked credential information is correct credential information. If it is determined that the checked credential information is correct credential information, since there is an authority to access the blockchain apparatus 111 (YES in step S1702), the blockchain application 406 advances the processing to step S1703, and, if it is determined that the checked credential information is not correct credential information (NO in step S1702), the blockchain application 406 advances the processing to step S1704.

In step S1703, the blockchain application 406 determines the received type of processing. If it is determined that the received type of processing is transaction registration (REGISTRATION in step S1703), the blockchain application 406 advances the processing to step S1705, if it is determined that the received type of processing is transaction acquisition (ACQUISITION in step S1703), the blockchain application 406 advances the processing to step S1710, and, if it is determined that the received type of processing is document verification (VERIFICATION in step S1703), the blockchain application 406 advances the processing to step S1713.

In step S1704, the blockchain application 406 generates error information indicating that an access authority to the blockchain apparatus 111 is not satisfied in the present flowchart.

In step S1705, the blockchain application 406 determines whether the transaction information received at the time of start-up of processing is complete. Moreover, the blockchain application 406 searches the blockchain apparatus 111 to check whether the document hash value 602 is still not registered in the blockchain apparatus 111 and whether the source document hash value 607 is previously registered in the blockchain apparatus 111. In a case where the transaction information is not complete or the hash values are not in the respective correct states, the transaction information is invalid information. In step S1706, the blockchain application 406 determines the result of checking in step S1705, and, if it is determined that the transaction information is valid (YES in step S1706), the blockchain application 406 advances the processing to step S1707, and, if it is determined that the transaction information is invalid information (NO in step S1706), the blockchain application 406 advances the processing to step S1709 for error processing.

In step S1707, the blockchain application 406 requests the blockchain apparatus 111 to register the checked transaction 601. In this step, the blockchain application 406 receives success or failure as a result of the registration processing from the blockchain apparatus 111.

In step S1708, the blockchain application 406 determines the result of the registration processing received from the blockchain apparatus 111, and, if it is determined that the result is failure (NO in step S1708), the blockchain application 406 advances the processing to step S1709 for error processing, and, if it is determined that the result is success (YES in step S1708), the blockchain application 406 advances the processing to step S1719. In step S1709, the blockchain application 406 generates error information indicating that the transaction registration is not able to be performed in the present flowchart.

In step S1710, the blockchain application 406 searches the blockchain apparatus 111 to acquire a transaction which holds the document identification number received at the time of start-up of processing. In step S1711, the blockchain application 406 determines a result of the searching, and, if it is determined that no transaction data has been acquired (NO in step S171.1), since the target document is not registered with the blockchain apparatus 111, the blockchain application 406 advances the processing to step S1712 for error processing. If it is determined that transaction data has been acquired (YES in step S1711), the blockchain application 406 advances the processing to step S1719. In step S1712, the blockchain application 406 generates error information indicating that the transaction acquisition is failed in the present flowchart.

In step S1713, the blockchain application 406 searches the blockchain apparatus 111 to acquire a transaction which holds the hash value received at the time of start-up of processing as a document hash value. In step S1714 the blockchain application 406 determines a result of the searching, and, if it is determined that transaction data has been acquired (YES in step S1714), the blockchain application 406 determines that the received hash value is a valid hash value and advances the processing to step S1715, and, if it is determined that no transaction data has been acquired (NO in step S1714), the blockchain application 406 determines that the received hash value is an invalid hash value and advances the processing to step S1718 for error processing.

In step S1715, the blockchain application 406 determines whether the transaction acquired in step S1713 contains a source document hash value. If it is determined that the acquired transaction contains no source document hash value (NO in step S1715), since the hash value acquired in step S1713 indicates a leading document, the blockchain application 406 terminates verification processing and then advances the processing to step S1719. If it is determined that the acquired transaction contains a source document hash value (YES in step S1715), since it is necessary to check the presence of a source document corresponding to the source document hash value, the blockchain application 406 advances the processing to step S1716.

In step S1716, the blockchain application 406 designates document verification as the type of processing and a source document hash value as the information required for processing, and recursively executes the flowchart illustrated in FIG. 17. In step S1717, the blockchain application 406 determines a result of this verification, and, if it is determined that verification including that of a source document is successful (YES in step S1717), the blockchain application 406 advances the processing to step S1719. If it is determined that the verification is failed (NO in step S1717), the blockchain application 406 advances the processing to step S1718 for error processing. In step S1718, the blockchain application 406 generates error information indicating that the document verification is failed in the present flowchart.

In step S1719, as information obtained when processing is successful for each type of processing, the blockchain application 406 communicates, to processing serving as an invoker, a registration completion status in the case of transaction registration and a verification success status in the case of document verification. The blockchain application 406 communicates, to processing serving as an invoker, the acquired transaction information in the case of transaction acquisition and error information in the case of error processing being performed.

As described above, according to the present exemplary embodiment, the image forming apparatus 101 is enabled to appropriately use a blockchain service.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random access memory (RAM), a read-only memory (ROM), a storage of distributed computing systems, an optical disk (such as a compact disc (CD), digital versatile disc (DVD) or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2019-133578 filed Jul. 19, 2019, which is hereby incorporated by reference herein in its entirety.

What is claimed is:

1. An image forming apparatus that cooperates with a management service which receives electronic data via a network and stores the electronic data and a blockchain service which manages information about the stored electronic data on a block-by-block basis and, upon defining association of each block with a previous and/or subsequent block, manages a plurality of blocks with a plurality of nodes, the image forming apparatus comprising:
one or more non-transitory computer-readable media storing instructions; and
one or more processors, wherein the one or more processors cooperate with the one or more non-transitory computer-readable media to cause the image forming apparatus to implement:

a transmitting unit configured to transmit, to the management service, electronic data generated based on an original read by a scanner of the image forming apparatus based on receipt of an instruction for storing the electronic data from a user at the management service; and a blockchain cooperation unit configured to transmit information about the electronic data to the blockchain service, wherein, based on receiving an instruction for using the blockchain service from the user, after the electronic data is transmitted and stored in the management service, the blockchain cooperation unit transmits, to the blockchain service, information about the electronic data including information indicating that storing of the electronic data transmitted has been completed, wherein, when not receiving an instruction for using the blockchain service from the user, after the electronic data transmitted by the transmitting unit is stored in the management service, the blockchain cooperation unit does not transmit, to the blockchain service, information about the electronic data including information indicating that storing of the electronic data transmitted by the transmitting unit has been completed.

2. The image forming apparatus according to claim 1, wherein the one or more processors cooperate with the one or more non-transitory computer-readable media to further cause the image forming apparatus to implement:

a providing unit configured to provide a registration screen used to receive an instruction for storing the electronic data in the management service and used to receive scan setting for generating the electronic data and an instruction for using the blockchain service.

3. The image forming apparatus according to claim 1, further comprising a printer configured to acquire the electronic data from the management service and print the acquired electronic data, wherein the printer performs printing in response to the blockchain cooperation unit confirming that a hash value of the acquired electronic data matches a hash value included in the information about the electronic data registered with the blockchain service.

4. The image forming apparatus according to claim 3, wherein, after the printer prints the electronic data, the blockchain cooperation unit transmits, to the blockchain service, information about a printed document along with the information about the electronic data.

5. The image forming apparatus according to claim 1, wherein, when receiving an instruction for verifying an original, the blockchain cooperation unit acquires a hash value from the generated electronic data, transmits the acquired hash value together with a request for verification to the blockchain service, receives a result of verification as a response, and displays the received result.

6. A non-transitory computer-readable storage medium storing computer-executable instructions that, when executed by a computer, cause the computer to perform a control method for controlling an image forming apparatus that cooperates with a management service which receives electronic data via a network and stores the electronic data and a blockchain service which manages information about the stored electronic data on a block-by-block basis and, upon defining association of each block with a previous and/or subsequent block, manages a plurality of blocks with a plurality of nodes, the control method comprising:

transmitting, to the management service, electronic data generated based on an original read by a scanner of the image forming apparatus based on receipt of an instruction for storing the electronic data from a user at the management service; and transmitting information about the electronic data to the blockchain service, wherein, based on an instruction for using the blockchain service received from the user, after the electronic data is transmitted and stored in the management service, information about the electronic data including information indicating that storing of the transmitted electronic data has been completed is transmitted to the blockchain service, and wherein, when an instruction for using the blockchain service is not received from the user, after the transmitted electronic data is stored in the management service, information about the electronic data including information indicating that storing of the transmitted electronic data has been completed is not transmitted to the blockchain service.

7. The non-transitory computer-readable storage medium according to claim 6, wherein the control method further comprises providing a registration screen used to receive an instruction for storing the electronic data in the management service and used to receive scan setting for generating the electronic data and an instruction for using the blockchain service.

8. The non-transitory computer-readable storage medium according to claim 6, wherein the control method further comprises acquiring the electronic data from the management service and printing the acquired electronic data, wherein printing of the acquired electronic data is performed in response to confirming that a hash value of the acquired electronic data matches a hash value included in the information about the electronic data registered with the blockchain service.

9. The non-transitory computer-readable storage medium according to claim 8, wherein, after the electronic data is printed, information about a printed document is transmitted along with the information about the electronic data to the blockchain service.

10. The non-transitory computer-readable storage medium according to claim 6, wherein, when an instruction for verifying an original is received, a hash value is acquired from the generated electronic data, the acquired hash value is transmitted together with a request for verification to the blockchain service, a result of verification is received as a response, and the received result is displayed.

11. A control method for controlling an image forming apparatus that cooperates with a management service which receives electronic data via a network and stores the electronic data and a blockchain service which manages information about the stored electronic data on a block-by-block basis and, upon defining association of each block with a previous and/or subsequent block, manages a plurality of blocks with a plurality of nodes, the control method comprising:

transmitting, to the management service, electronic data generated based on an original read by a scanner of the image forming apparatus based on receipt of an instruction for storing the electronic data from a user at the management service; and transmitting information about the electronic data to the blockchain service, wherein, based on an instruction for using the blockchain service received from the user, after the electronic data is transmitted and stored in the management service, information about the electronic data including information indicating that storing of the transmitted electronic data has been completed is transmitted to the blockchain service,
wherein, when an instruction for using the blockchain service is not received from the user, after the transmitted electronic data is stored in the management service, information about the electronic data including information indicating that storing of the transmitted electronic data has been completed is not transmitted to the blockchain service.

12. The control method according to claim 11, wherein the control method further comprises providing a registration screen used to receive an instruction for storing the electronic data in the management service and used to receive scan setting for generating the electronic data and an instruction for using the blockchain service.

13. The control method according to claim 11, wherein the control method further comprises acquiring the electronic data from the management service and printing the acquired electronic data,
wherein printing of the acquired electronic data is performed in response to confirming that a hash value of the acquired electronic data matches a hash value included in the information about the electronic data registered with the blockchain service.

14. The control method according to claim 13, wherein, after the electronic data is printed, information about a printed document is transmitted along with the information about the electronic data to the blockchain service.

15. The control method according to claim 11, wherein, when an instruction for verifying an original is received, a hash value is acquired from the generated electronic data, the acquired hash value is transmitted together with a request for verification to the blockchain service, a result of verification is received as a response, and the received result is displayed.

16. An image forming apparatus that cooperates with a management service which receives electronic data via a network and stores the electronic data, and with a blockchain service which manages information about the stored electronic data, the image forming apparatus comprising:
one or more non-transitory computer-readable media storing instructions; and
one or more processors processing the instructions to cause the image forming apparatus to:
transmit, to the management service, electronic data generated by reading, performed based on receipt of an instruction from a user, of an original by a scanner of the image forming apparatus; and
transmit, to the blockchain service, information about the electronic data and device information of the image forming apparatus, after the electronic data is transmitted to the management service and is then stored into the management service.

17. The image forming apparatus according to claim 16, wherein
when the instruction for using the blockchain service is not received from the user, the blockchain cooperation unit does not transmit, to the blockchain service, the information about the electronic data and the information about storing the electronic data into the management service.

18. The image forming apparatus according to claim 16, wherein
the blockchain service manages the information about the electronic data on a block-by-block basis, defines association of each block with a previous and/or a subsequent block, and manages a plurality of blocks with a plurality of nodes.

19. The image forming apparatus according to claim 16, wherein
a screen that includes an instruction interface for receiving the instruction for storing the electronic data and an instruction interface for receiving the instruction for using the blockchain service is displayed.

20. The image forming apparatus according to claim 19, wherein the information about storing the electronic data into the management service is information that indicates date and time at which the electronic data was stored into the management service.

21. The image forming apparatus according to claim 16, wherein the one or more processors process the instructions to further cause the image forming apparatus to acquire the electronic data from the management service and perform printing of the acquired electronic data, wherein the printing is performed in response to a hash value of the acquired electronic data having been confirmed to match a hash value included in the information about the electronic data registered in the blockchain service.

22. The image forming apparatus according to claim 21, wherein the blockchain cooperation unit transmits, to the blockchain service, information about a printed document together with the information about the electronic data.

23. The image forming apparatus according to claim 16, wherein, in a case where an instruction for verifying an original has been received, a request of verification is transmitted to the blockchain service.

24. A non-transitory computer-readable storage medium storing computer-executable instructions that, when executed by a computer, cause the computer to perform a control method for controlling an image forming apparatus that cooperates with a management service which receives electronic data via a network and stores the electronic data, and with a blockchain service which manages information about the stored electronic data, the control method comprising:
transmitting, to the management service, electronic data generated by reading, performed based on receipt of an instruction from a user, of an original by a scanner of the image forming apparatus; and
transmitting, to the blockchain service, information about the electronic data and device information of the image forming apparatus, after the electronic data is transmitted to the management service and is then stored into the management service.

25. The non-transitory computer-readable storage medium according to claim 24, wherein
when the instruction for using the blockchain service is not received from the user, the information about the electronic data and the information about storing the electronic data into the management service are not transmitted to the blockchain service.

26. A control method for controlling an image forming apparatus that cooperates with a management service which receives electronic data via a network and stores the electronic data, and with a blockchain service which manages information about the stored electronic data, the control method comprising:
transmitting, to the management service, electronic data generated by reading, performed based on receipt of an instruction from a user, of an original by a scanner of the image forming apparatus; and transmitting, to the blockchain service, information about the electronic data and device information of the image forming apparatus, after the electronic data is transmitted to the management service and is then stored into the management service.

27. The control method according to claim 26, wherein when the instruction for using the blockchain service is not received from the user, the information about the electronic data and the information about storing the electronic data into the management service are not transmitted to the blockchain service.

* * * * *